United States Patent
Choi et al.

(10) Patent No.: US 12,483,970 B2
(45) Date of Patent: Nov. 25, 2025

(54) METHOD FOR TRANSMITTING AND RECEIVING DATA AND DEVICE FOR SAME IN SHORT-RANGE WIRELESS COMMUNICATION SYSTEM

(71) Applicant: LG ELECTRONICS INC., Seoul (KR)

(72) Inventors: Jingu Choi, Seoul (KR); Hangyu Cho, Seoul (KR); Hyeonjae Lee, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 18/257,058

(22) PCT Filed: Dec. 13, 2021

(86) PCT No.: PCT/KR2021/018880
§ 371 (c)(1),
(2) Date: Jun. 12, 2023

(87) PCT Pub. No.: WO2022/124870
PCT Pub. Date: Jun. 16, 2022

(65) Prior Publication Data
US 2024/0049116 A1 Feb. 8, 2024

(30) Foreign Application Priority Data

Dec. 11, 2020 (KR) .................. 10-2020-0173288

(51) Int. Cl.
*H04W 48/10* (2009.01)
*H04W 72/30* (2023.01)
*H04W 76/14* (2018.01)

(52) U.S. Cl.
CPC ........... *H04W 48/10* (2013.01); *H04W 72/30* (2023.01); *H04W 76/14* (2018.02)

(58) Field of Classification Search
CPC ......... H04W 4/08; H04W 4/80; H04W 48/10; H04W 72/30; H04W 76/11; H04W 76/14; H04W 76/20; H04W 8/005; H04W 84/20
See application file for complete search history.

(56) References Cited

U.S. PATENT DOCUMENTS 10,863,468 B1 * 12/2020 Kerai .................... H04J 3/0638
11,202,216 B2 * 12/2021 Seeber ............... H04W 12/121
(Continued)

FOREIGN PATENT DOCUMENTS

JP   2004-274532      9/2004
KR  10-2004-0036279   4/2004
(Continued)

OTHER PUBLICATIONS

PCT International Application No. PCT/KR2021/018880, International Search Report dated Mar. 22, 2022, 4 page.
(Continued)

*Primary Examiner* — Awet Haile
(74) *Attorney, Agent, or Firm* — LEE, HONG, DEGERMAN, KANG & WAIMEY

(57) ABSTRACT

Provided are a method for transmitting and receiving data and a device for same in a short-range wireless communication system. More specifically, the method comprises the steps of: receiving, from a first slave device, a first advertising message for providing a service related to transmitting and receiving the data; forming a shared link, which is for transmitting and receiving the data and is formed on the basis of the first advertising message, on the basis of link parameters for the configuration of the shared link, the shared link including (i) a first link for data transmission from a master device to a slave device, and (ii) a second link for data transmission from the slave device to the master device; and receiving, from a second slave device, a second advertising message for providing the service. wherein the (Continued)

link parameters applied to the shared link are updated on the basis of the second advertising message in order to add the second slave device as a slave device related to the shared link, and the updated link parameters are configured as different values for each of (i) the first link, and (ii) the second link on the basis of the characteristics of the first and second links.

15 Claims, 36 Drawing Sheets

(56) References Cited

U.S. PATENT DOCUMENTS

| | | | | |
|---|---|---|---|---|
| 2004/0088387 A1* | 5/2004 | Kim | ........................ | H04L 67/55 709/220 |
| 2014/0355517 A1* | 12/2014 | Reunamaki | ........... | H04W 8/005 370/328 |
| 2015/0131645 A1* | 5/2015 | Reunamaki | ........... | H04W 56/00 370/350 |
| 2015/0341450 A1* | 11/2015 | Reunamaki | ............. | H04L 67/52 705/14.58 |
| 2015/0350329 A1* | 12/2015 | Kolli | ....................... | H04L 67/12 709/217 |
| 2017/0245285 A1* | 8/2017 | Palin | .................... | H04W 72/542 |
| 2018/0007499 A1* | 1/2018 | Lee | ....................... | H04W 76/10 |
| 2021/0240464 A1* | 8/2021 | Jalisatgi | .................... | G06F 8/65 |
| 2023/0189366 A1* | 6/2023 | Hou | ..................... | H04W 76/15 |

FOREIGN PATENT DOCUMENTS

| | | |
|---|---|---|
| KR | 10-2012-0128928 | 11/2012 |
| WO | 2018-222024 | 12/2018 |

OTHER PUBLICATIONS

Leonardi, et al., "Multi-Hop Real-Time Communications Over Bluetooth Low Energy Industrial Wireless Mesh Networks," IEEE Access, vol. 6, 2018, E-ISSN: 2169-3536, 15 pages.

* cited by examiner

[FIG. 1]
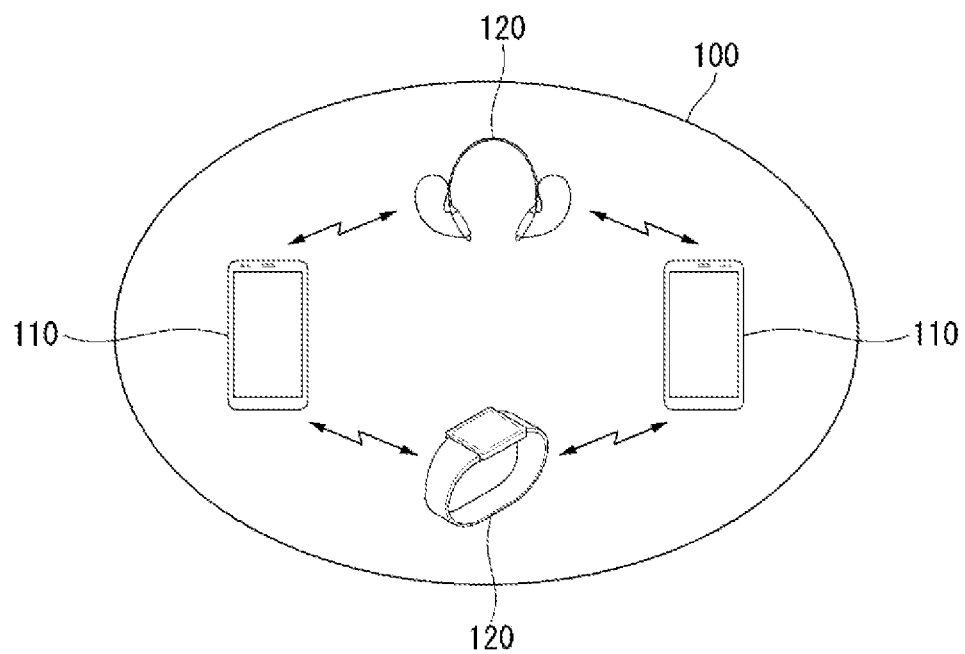

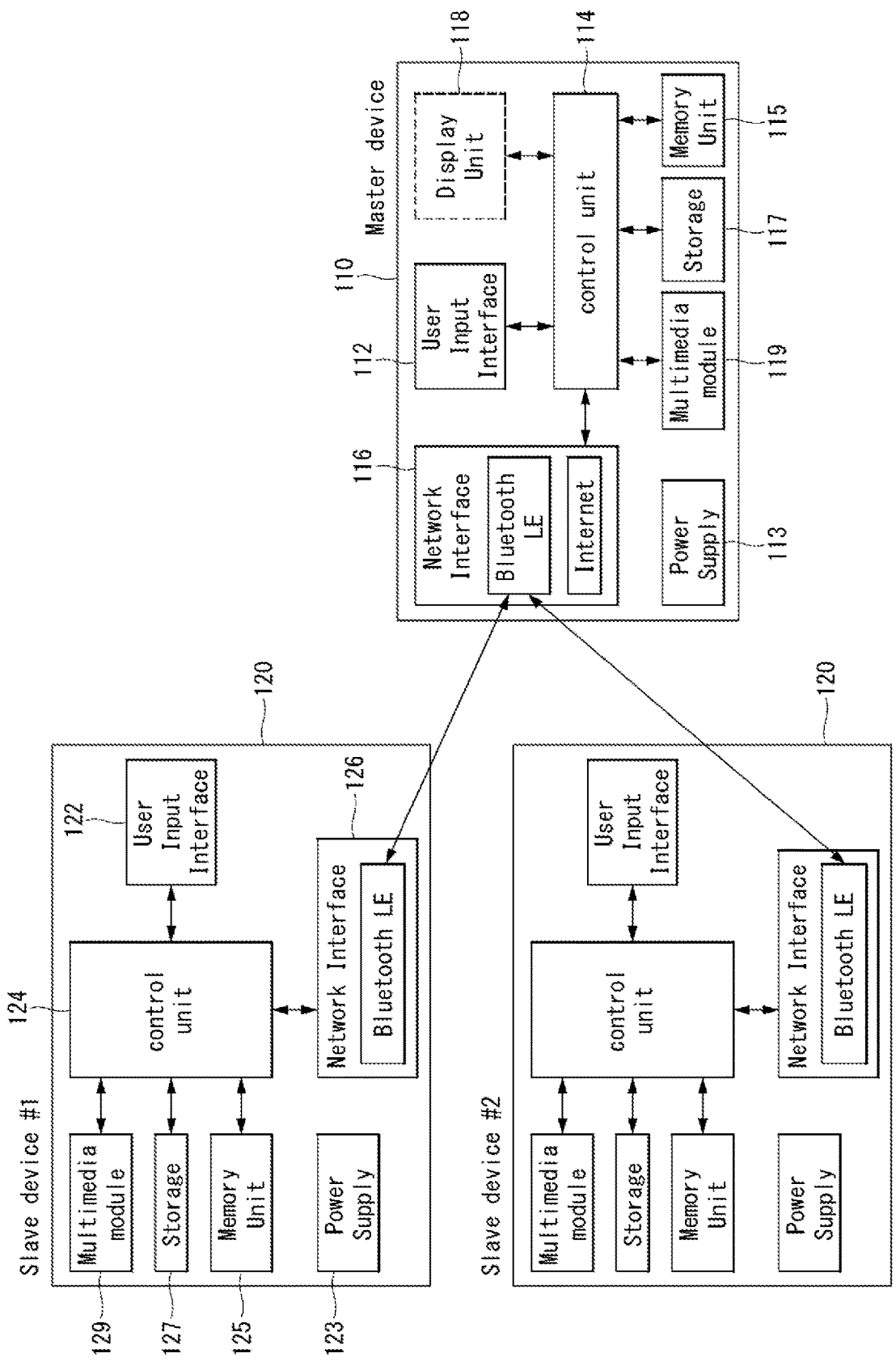
[FIG. 2]

[FIG. 3]
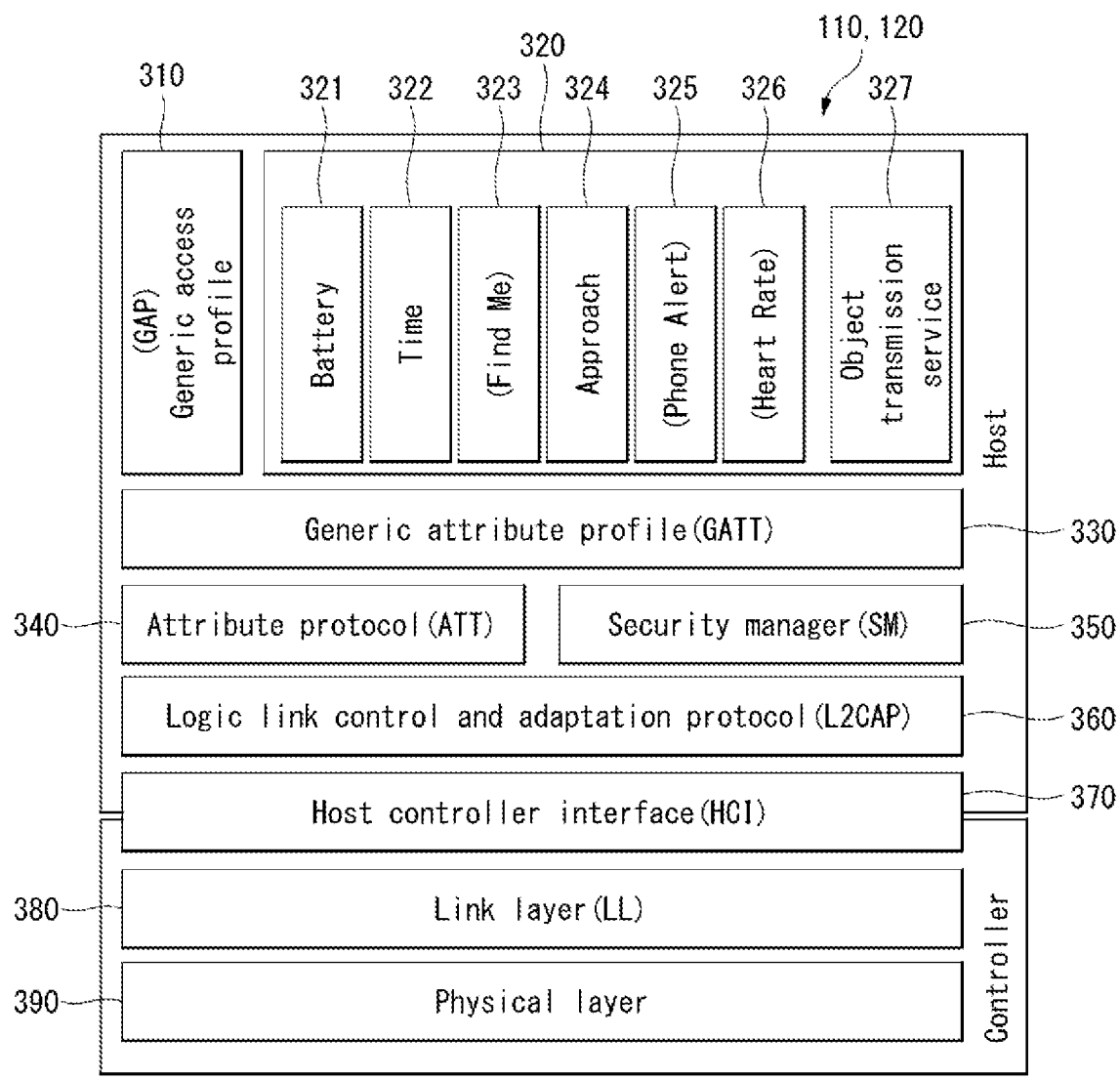

[FIG. 4]
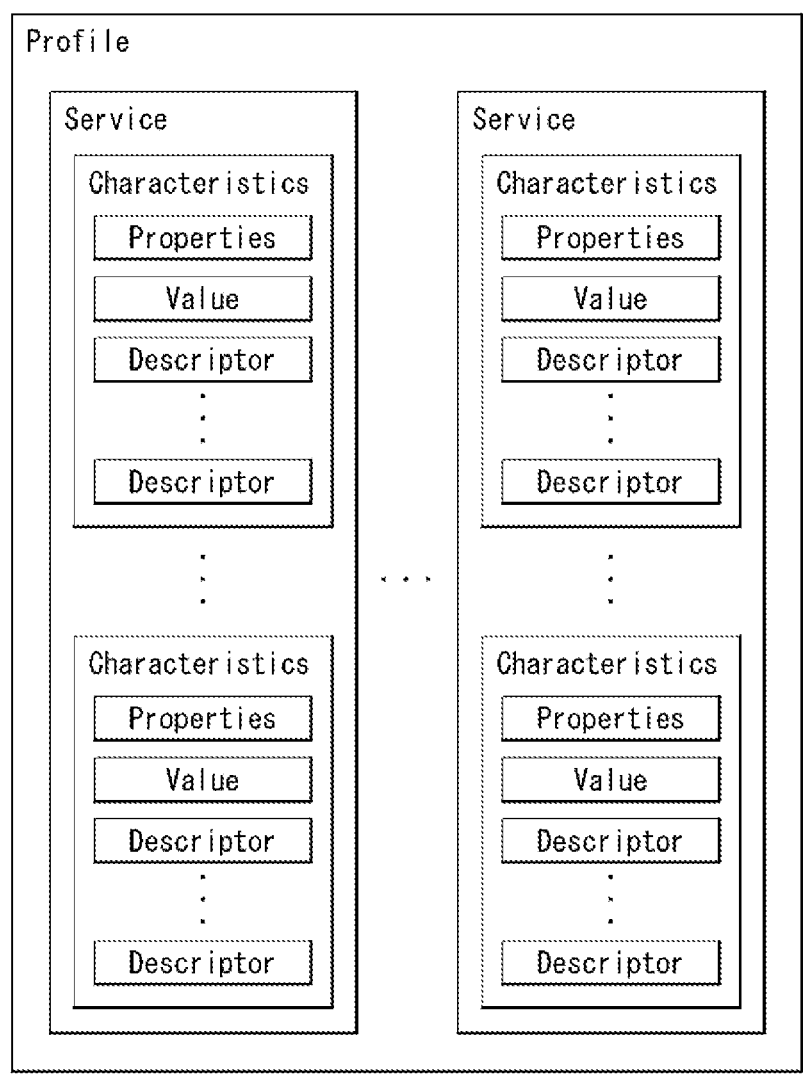

[FIG. 5]
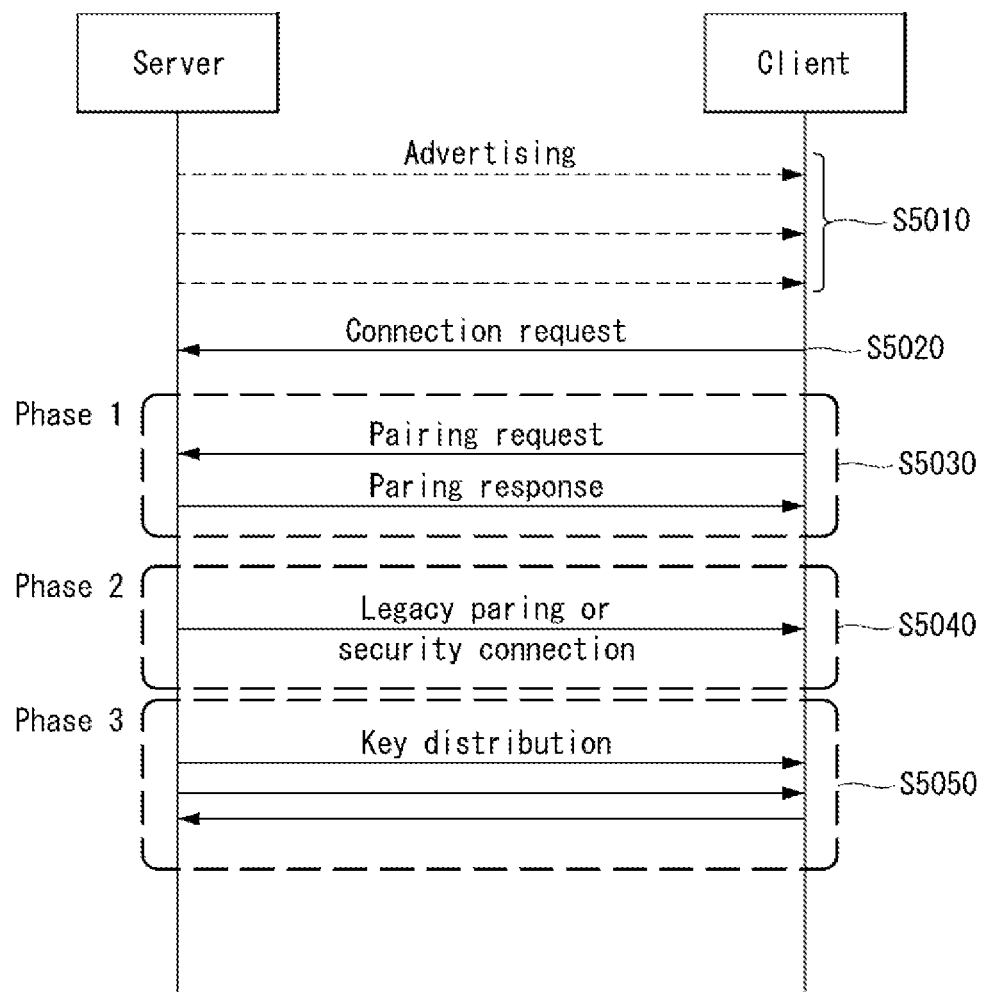

[FIG. 6]
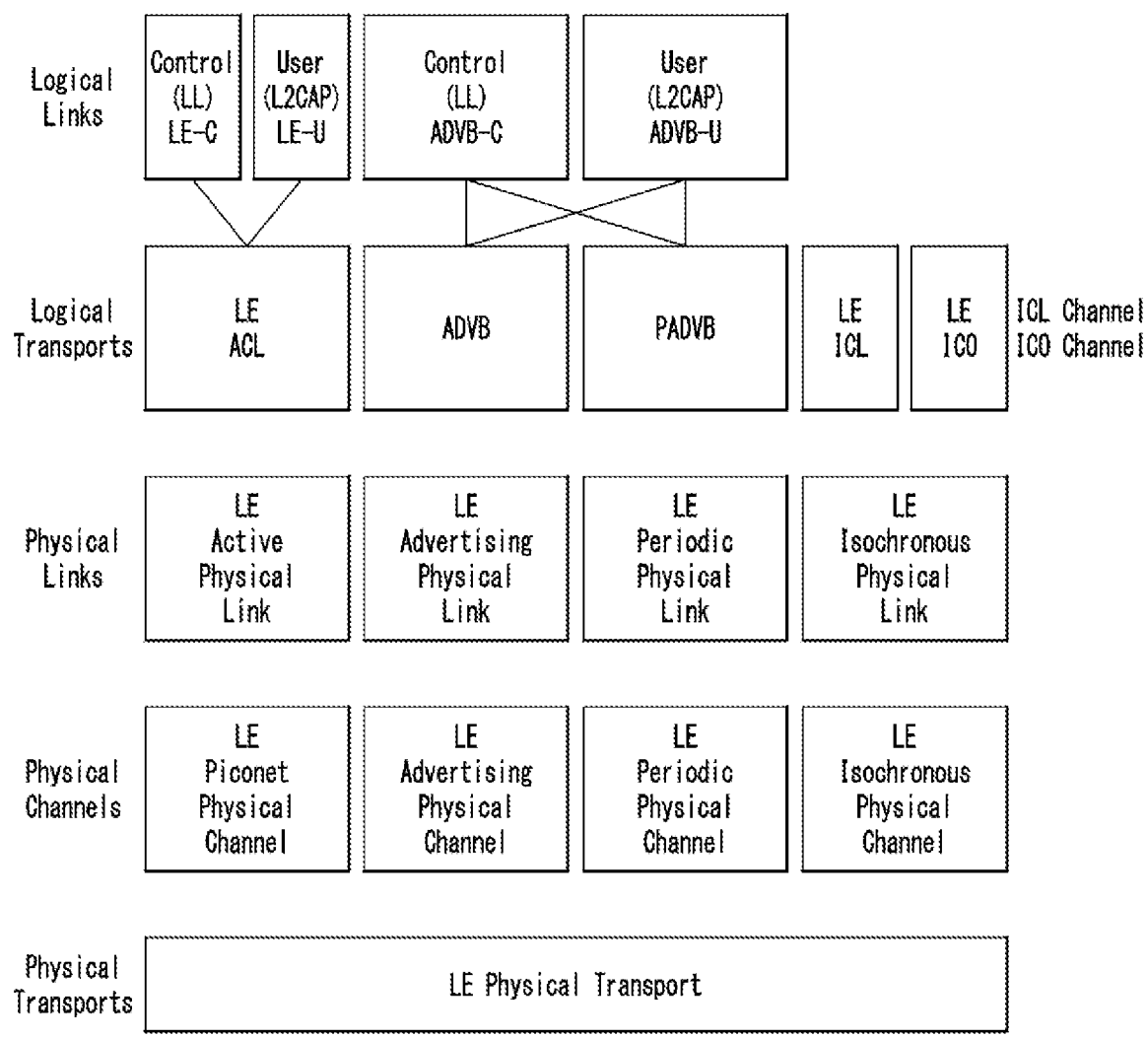

[FIG. 7]
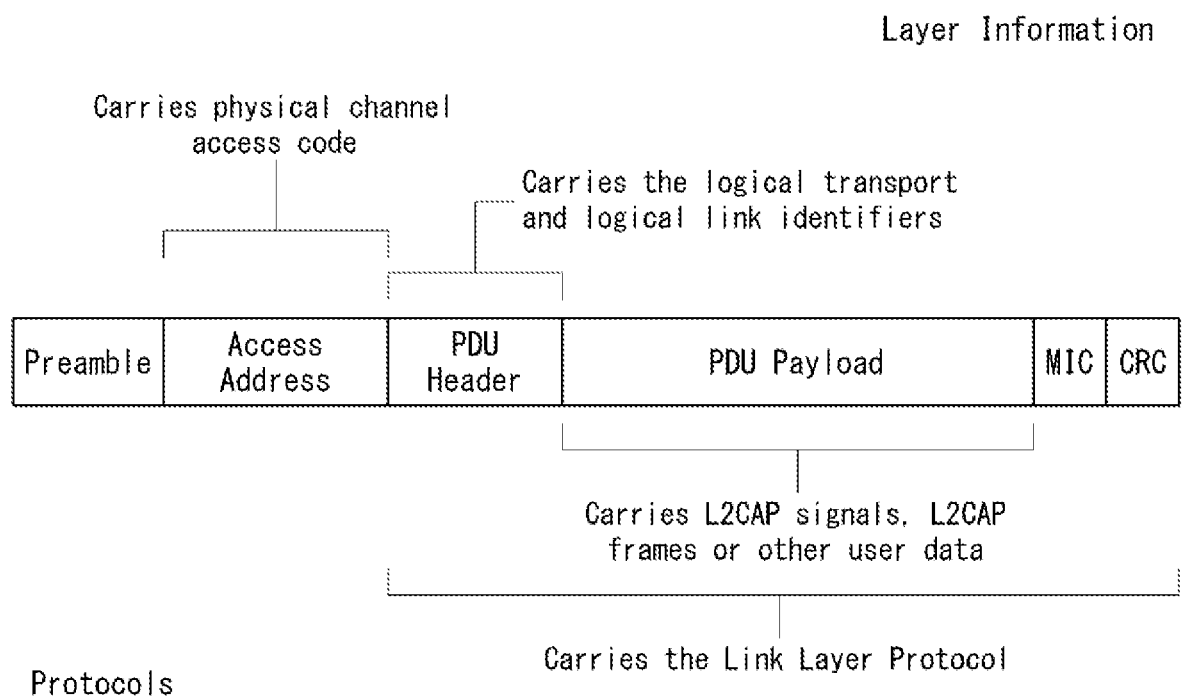

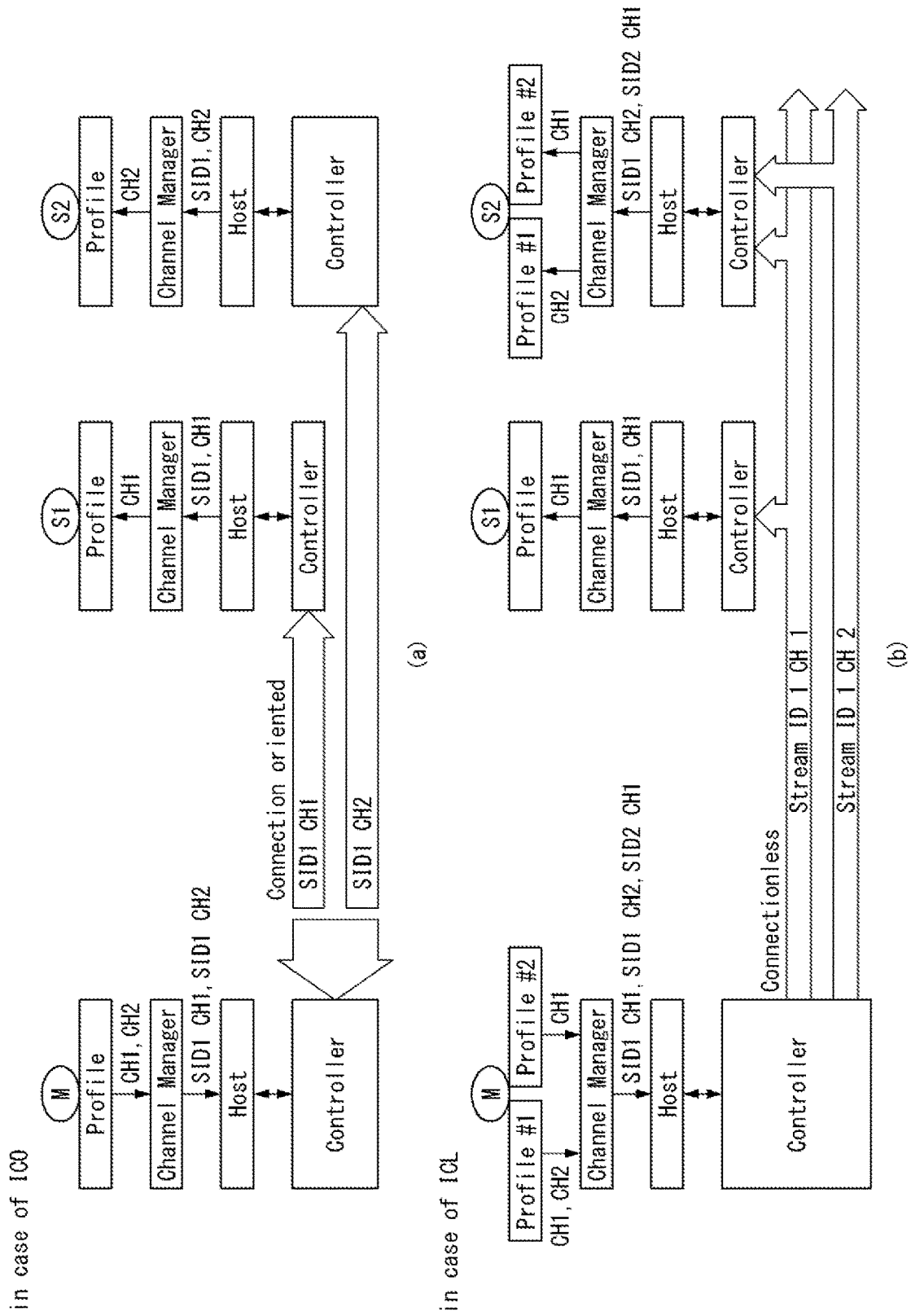
[FIG. 8]

[FIG. 9]
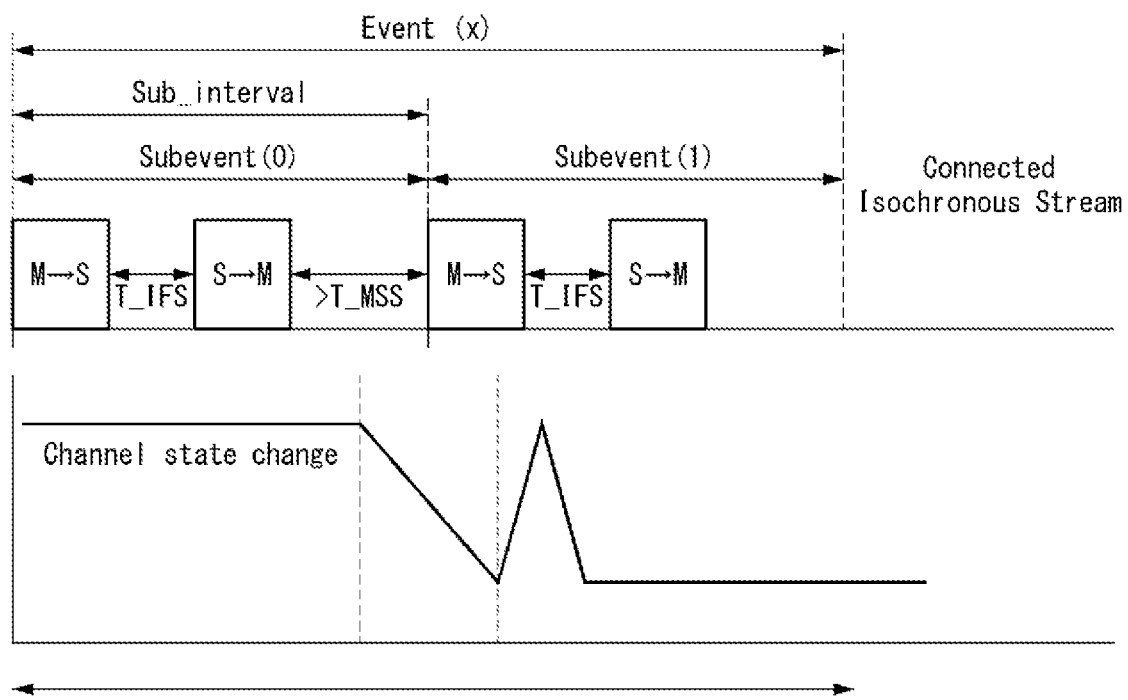

[FIG. 10]
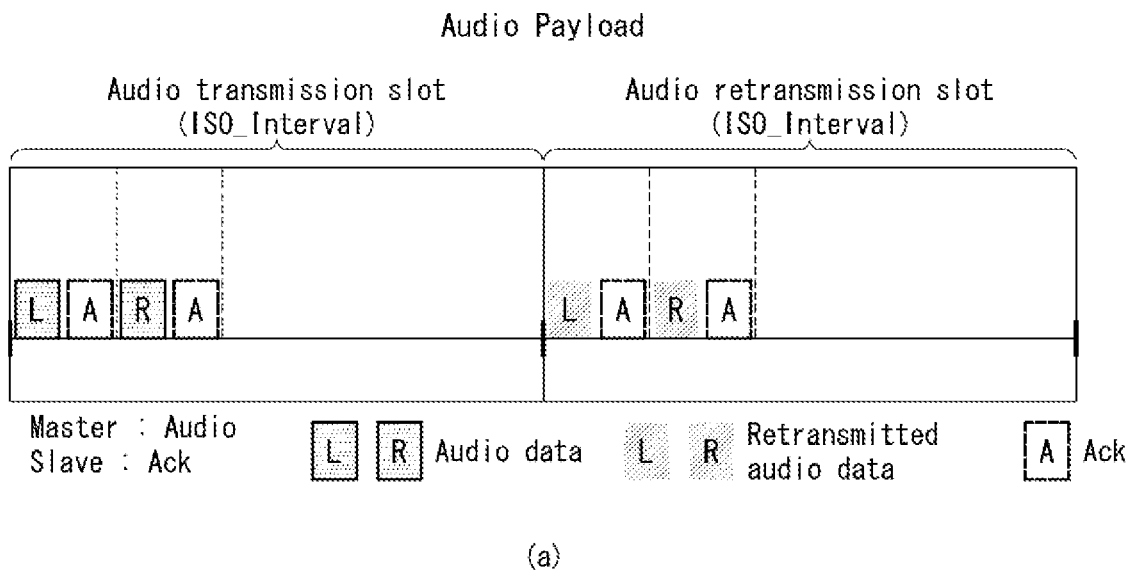
(a)
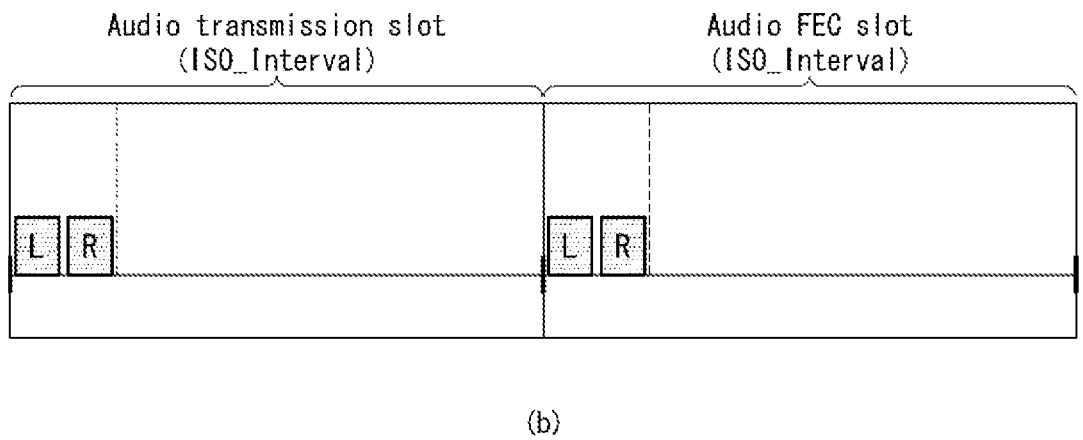
(b)
[FIG. 11]
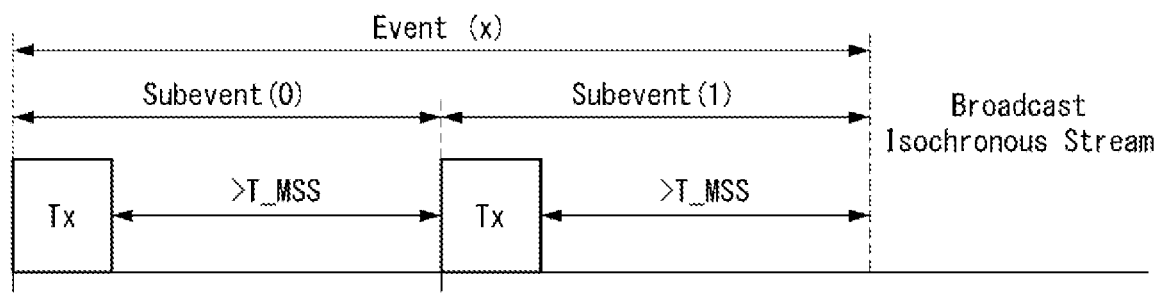

[FIG. 12]
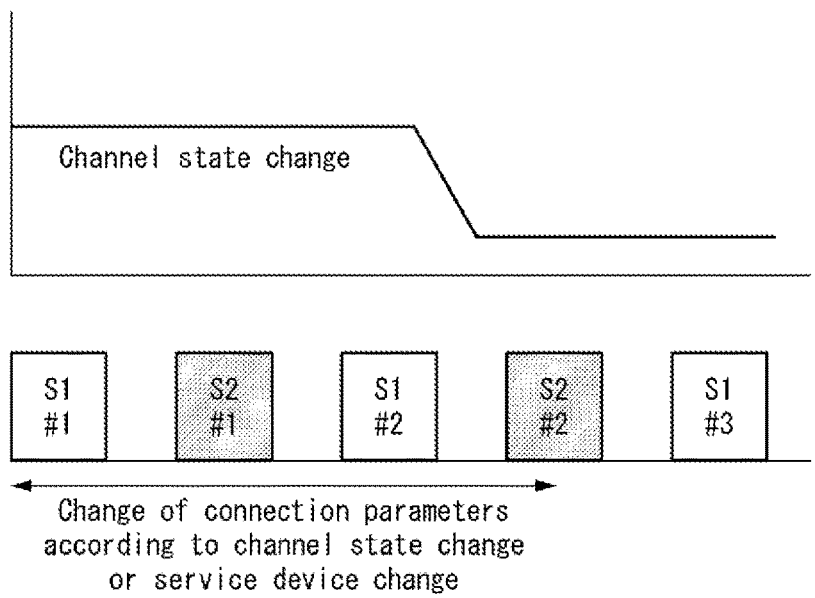
[FIG. 13]
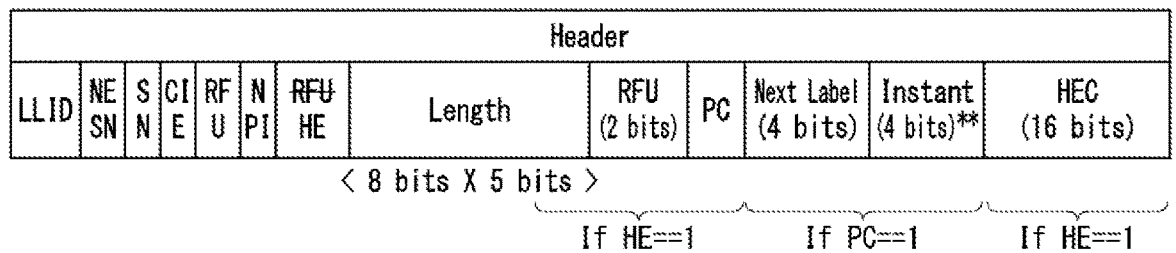
** Last 4 bits of CIS eventoount when update takes effect.
Remains constant PC-Parameter Change Bit
[FIG. 14]
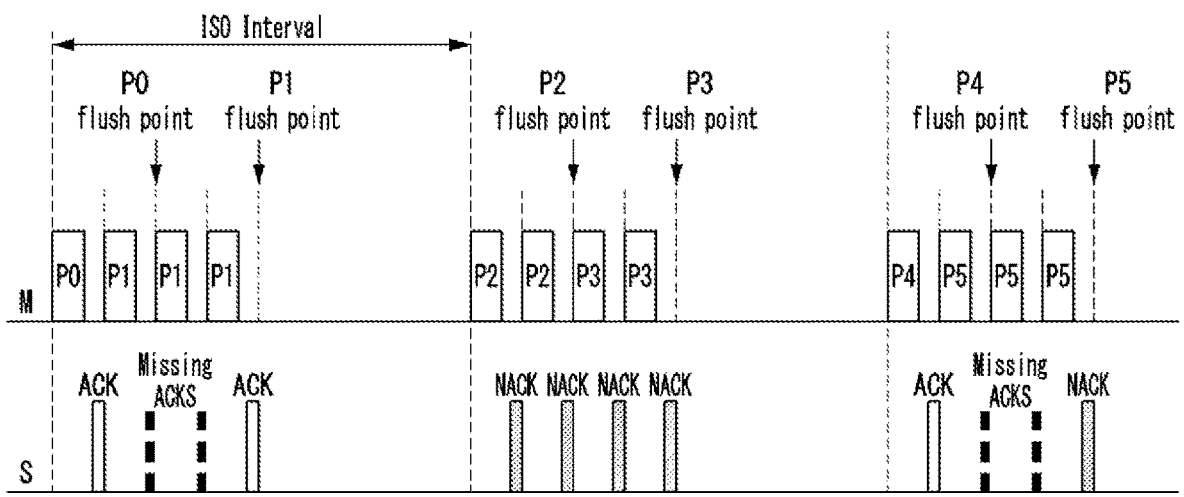

[FIG. 15]
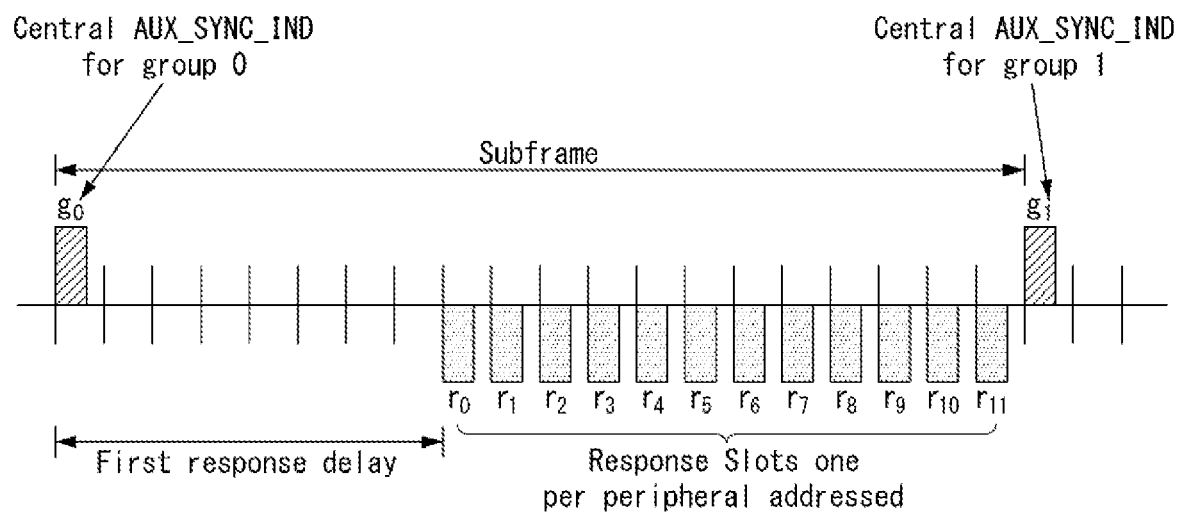

[FIG. 16]
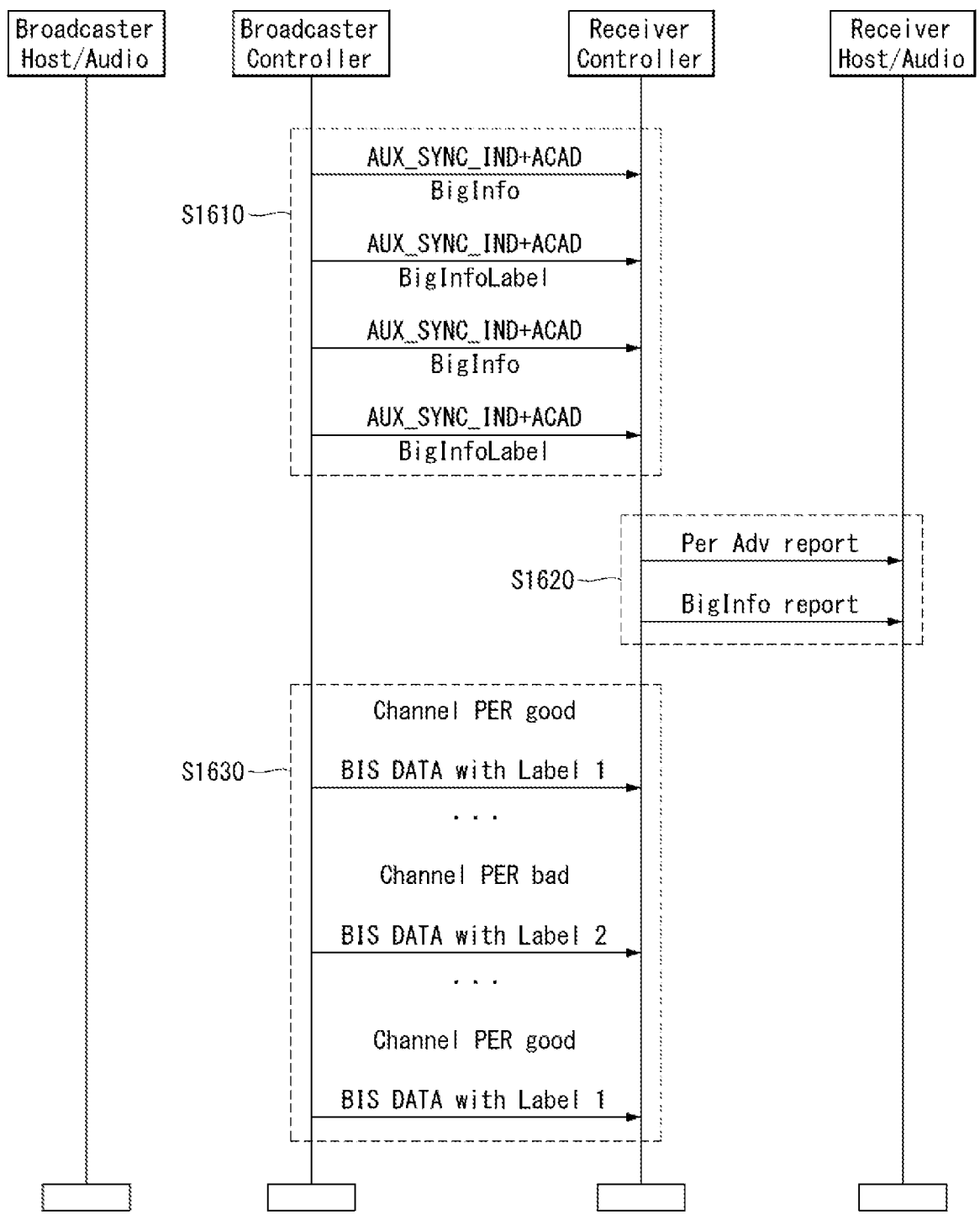

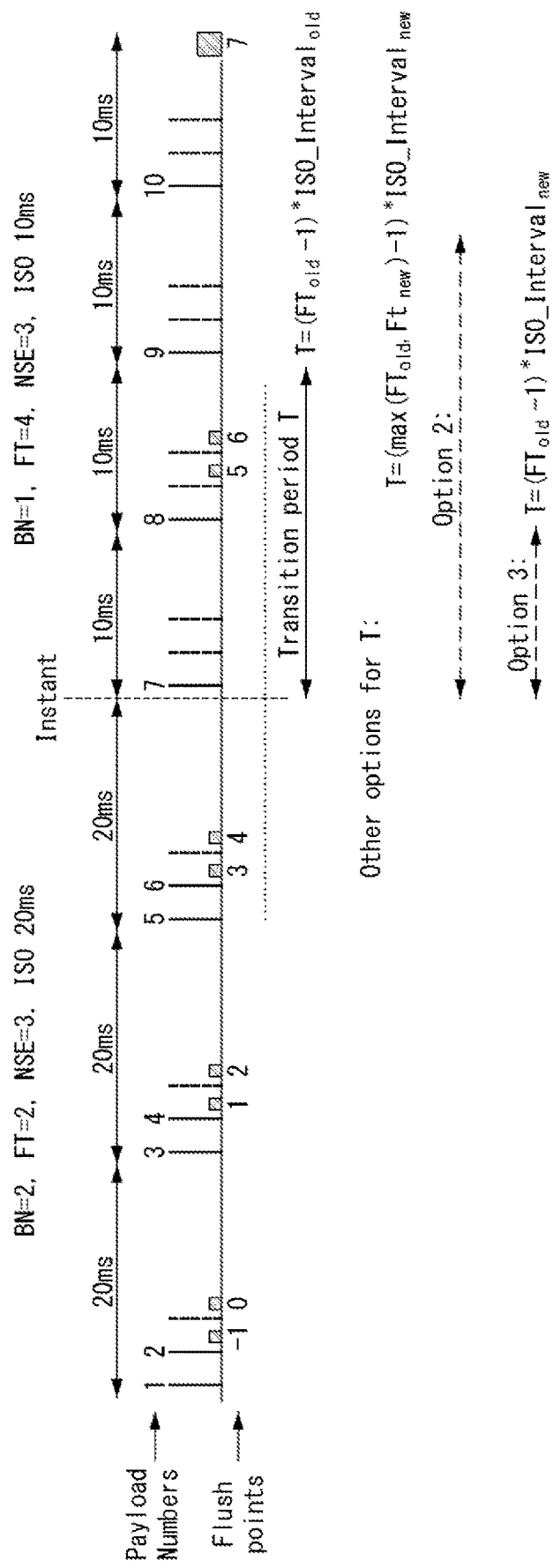
[FIG. 17]

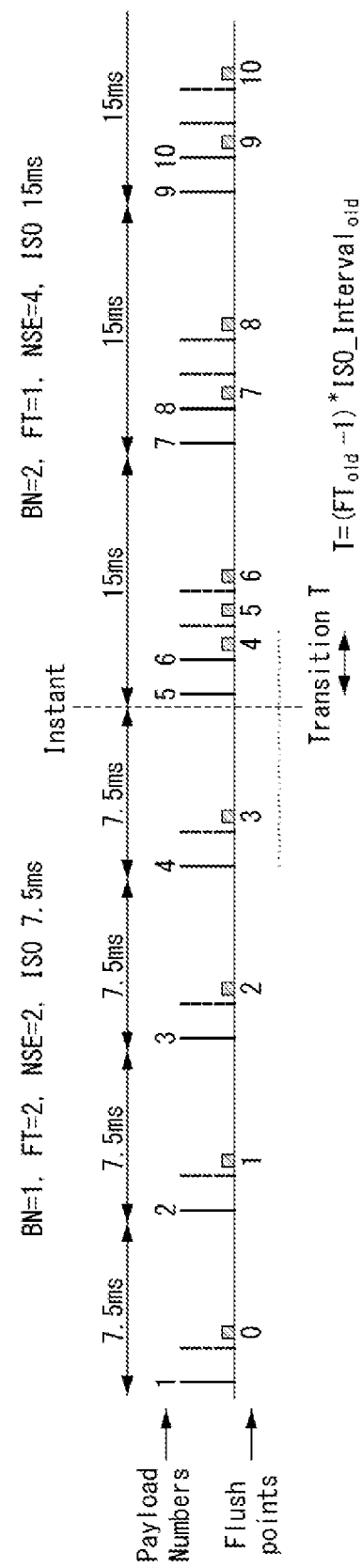
[FIG. 18]

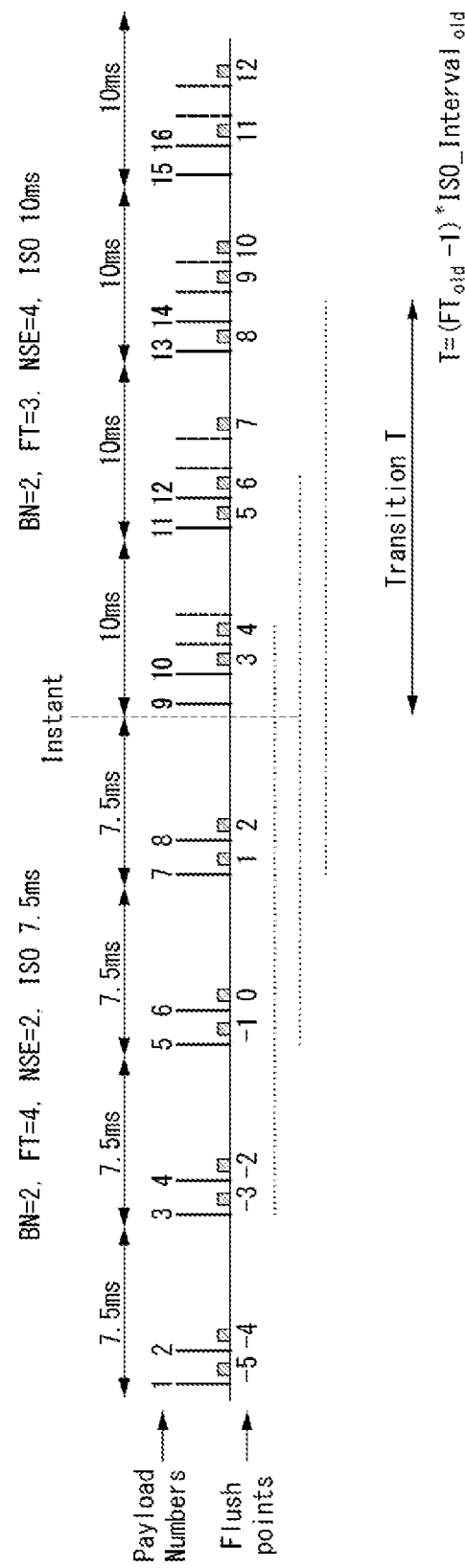

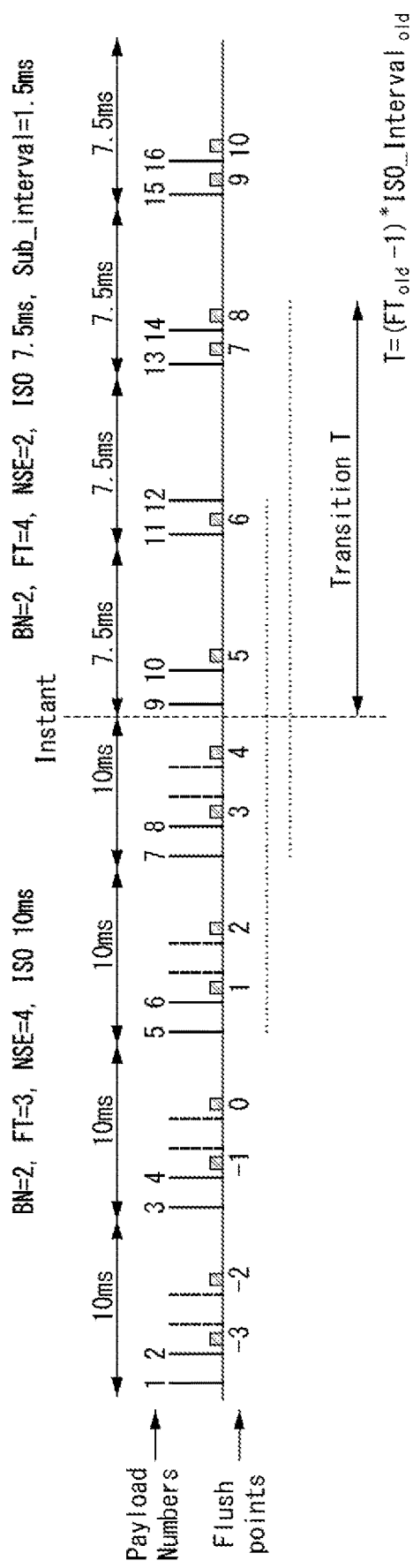
[FIG. 20]

[FIG. 21]
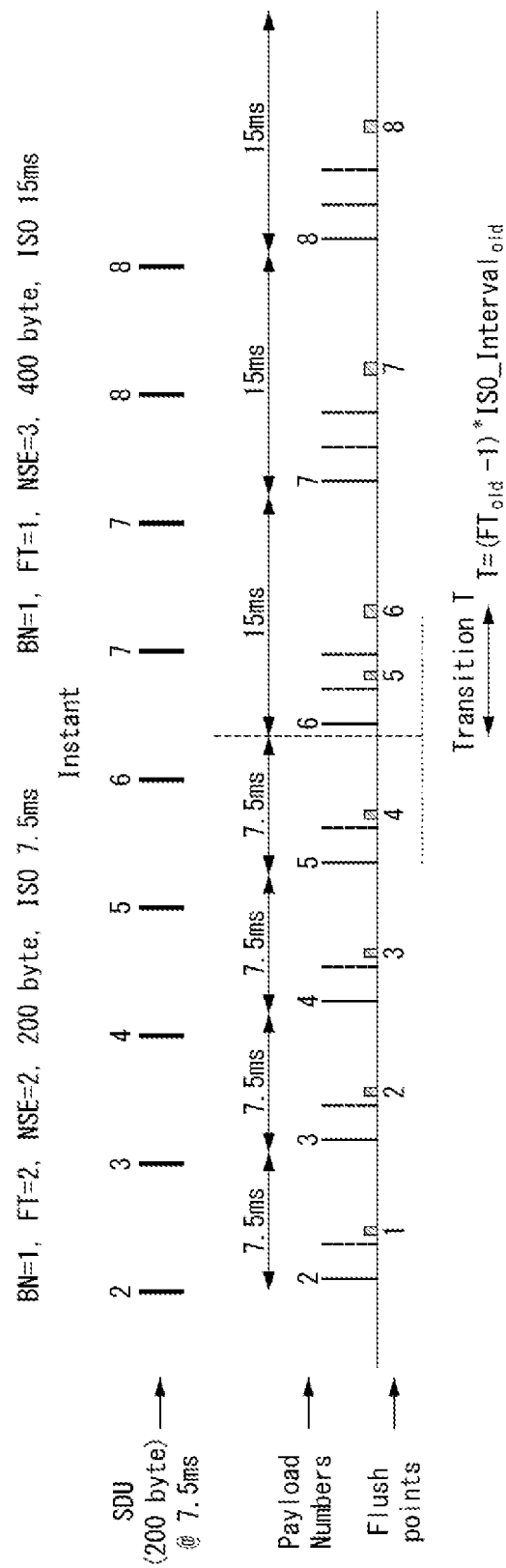

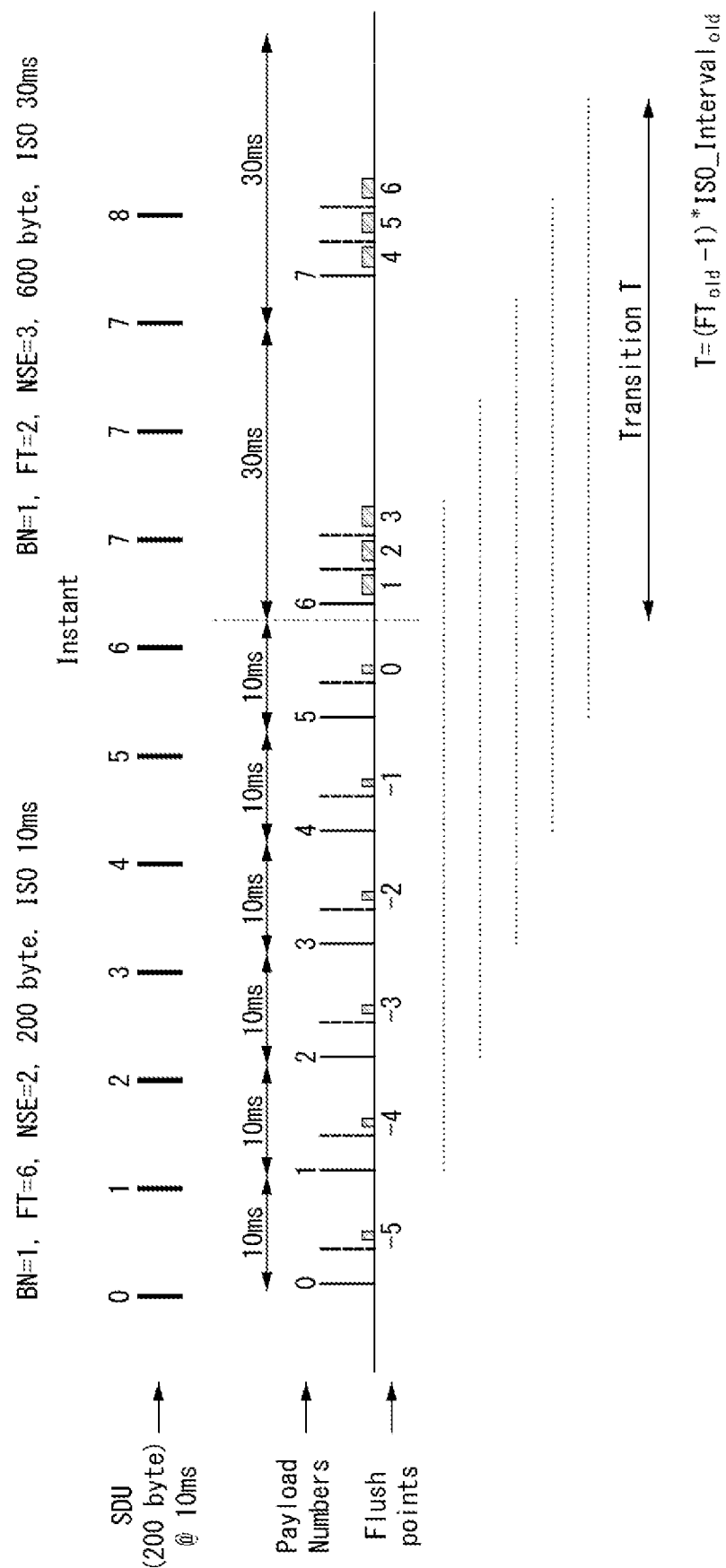
[FIG. 22]

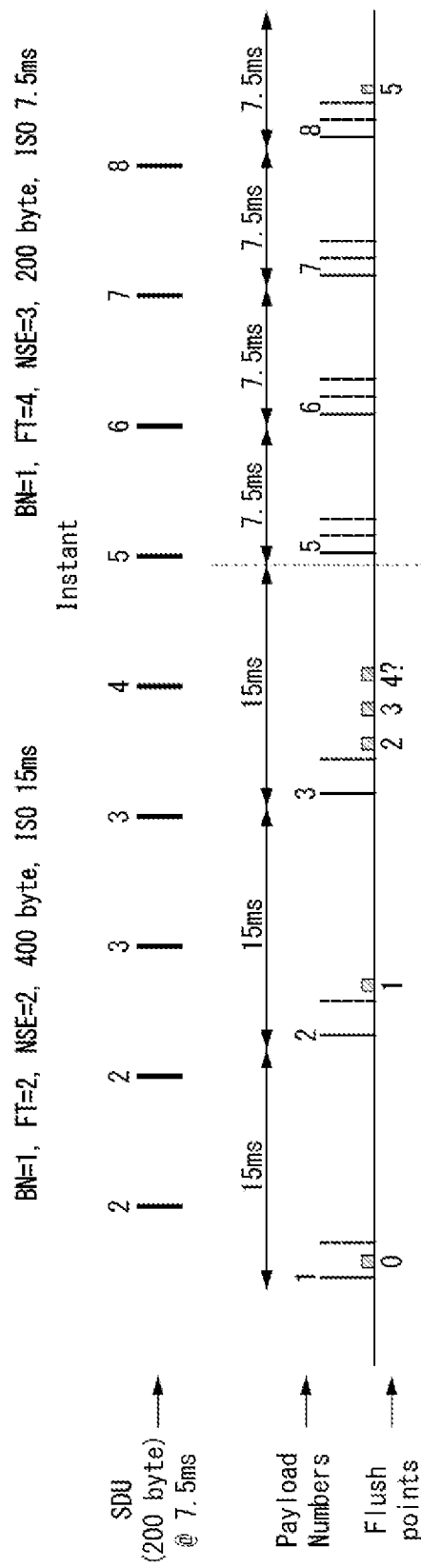
[FIG. 23]

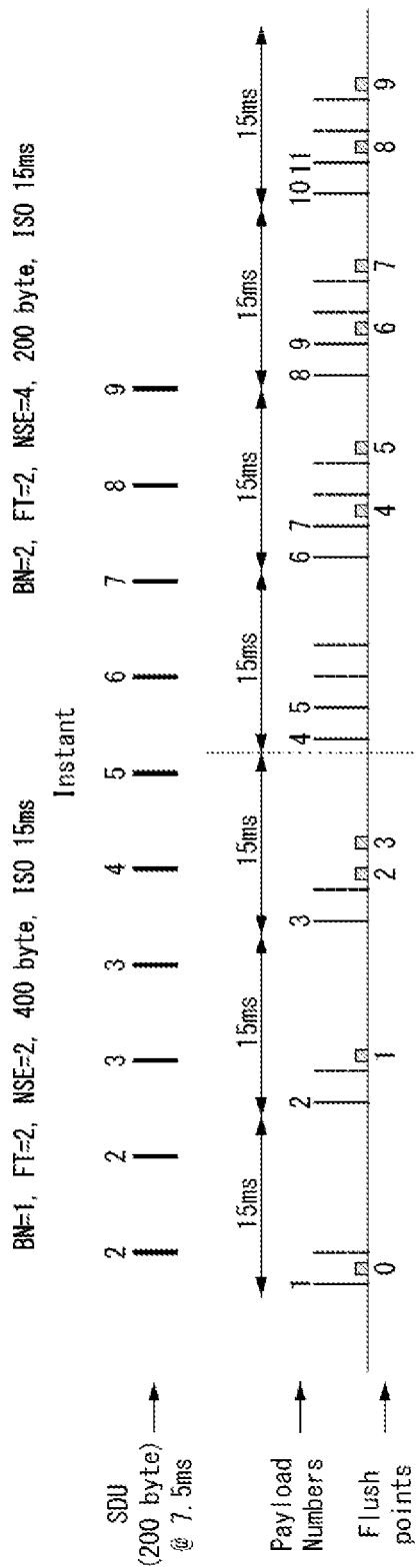
[FIG. 24]

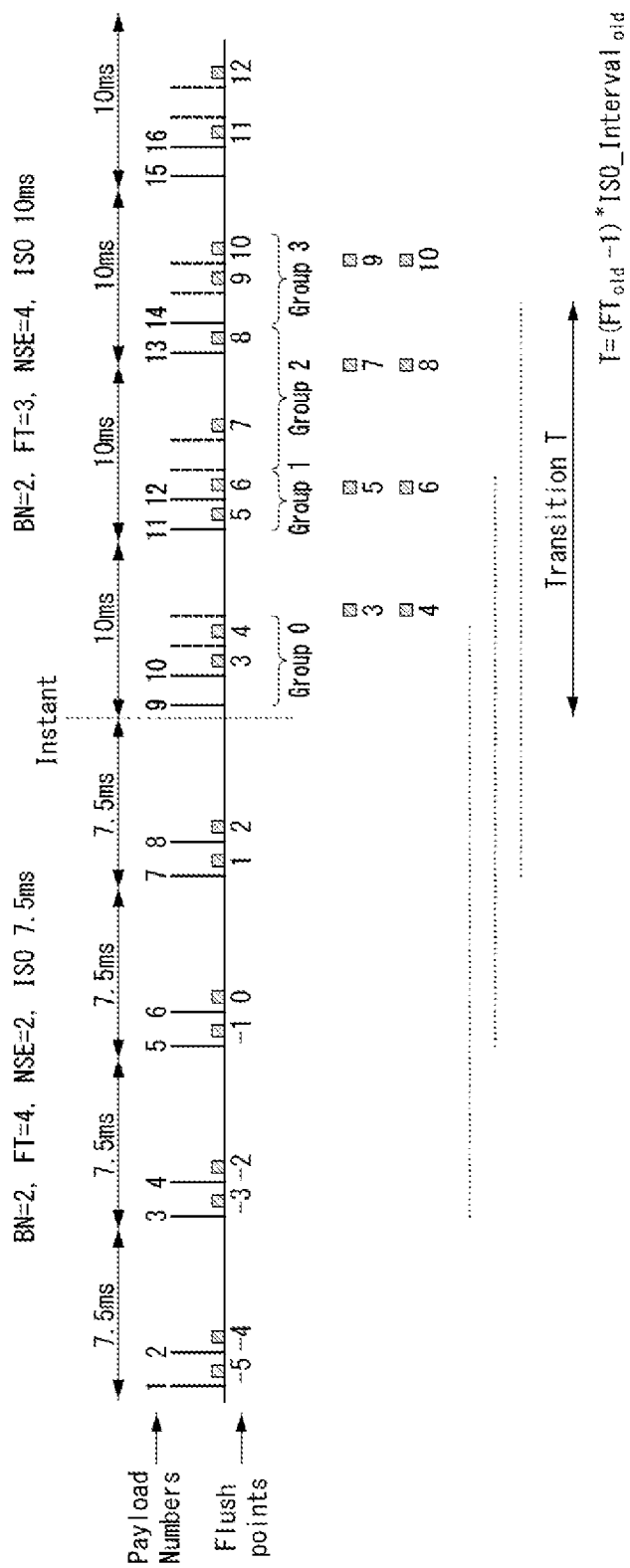
[FIG. 25]

[FIG. 26]
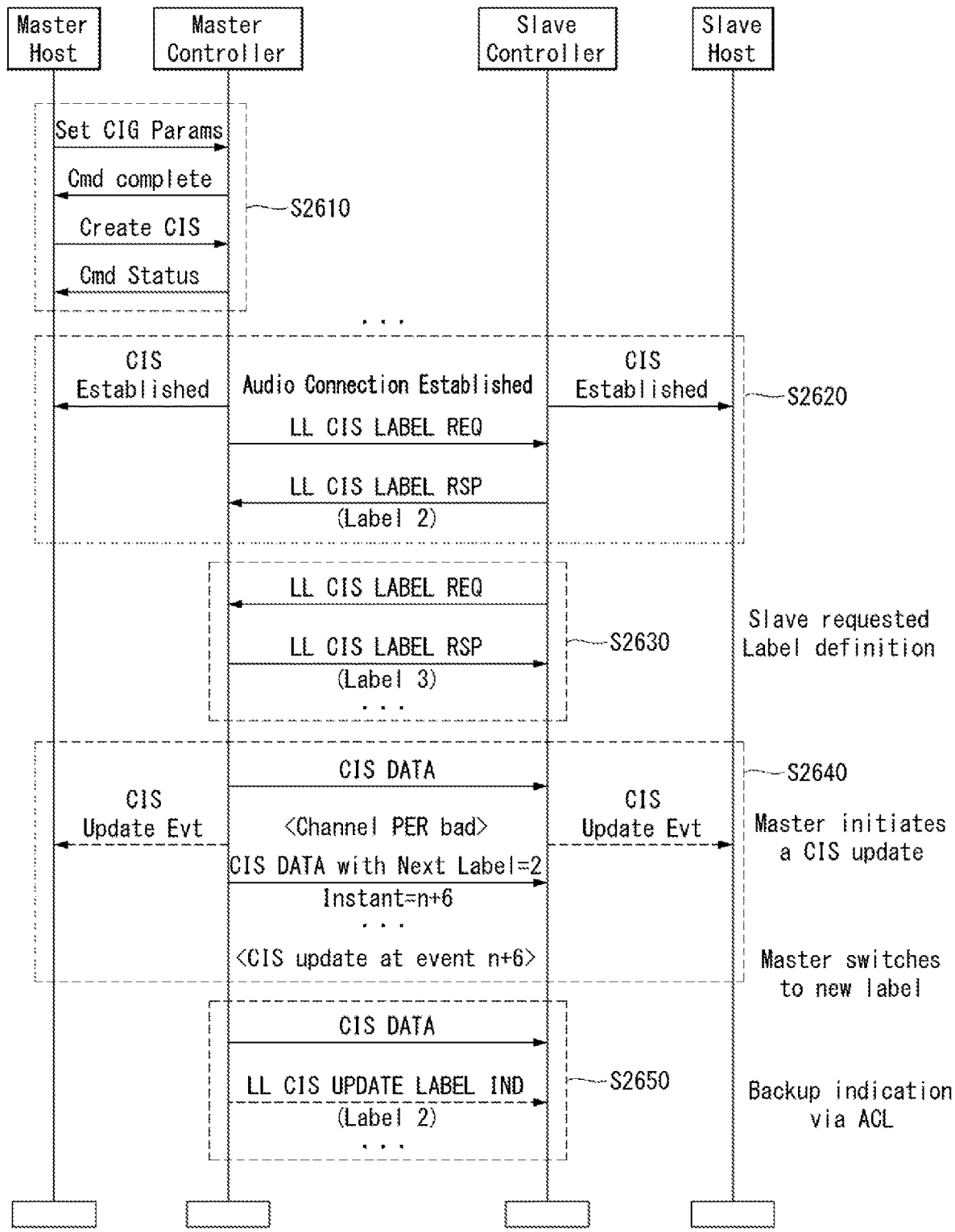

[FIG. 27]
(a)
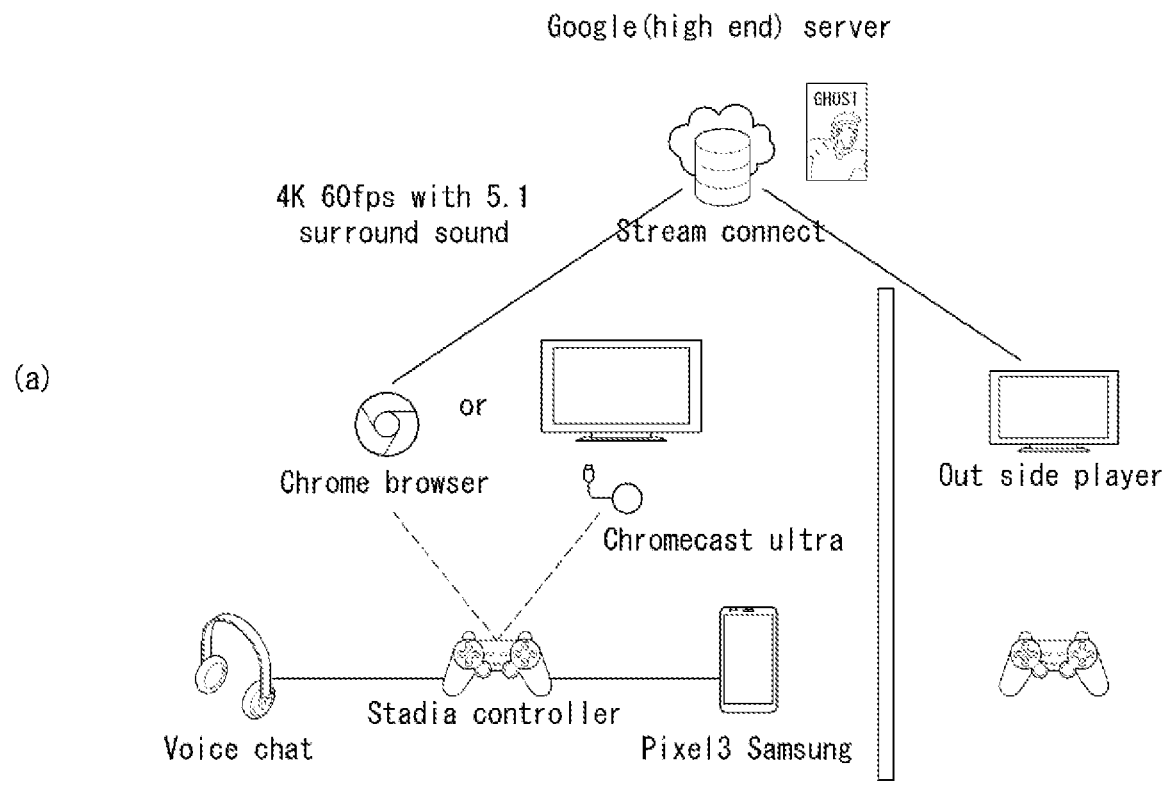
(b)
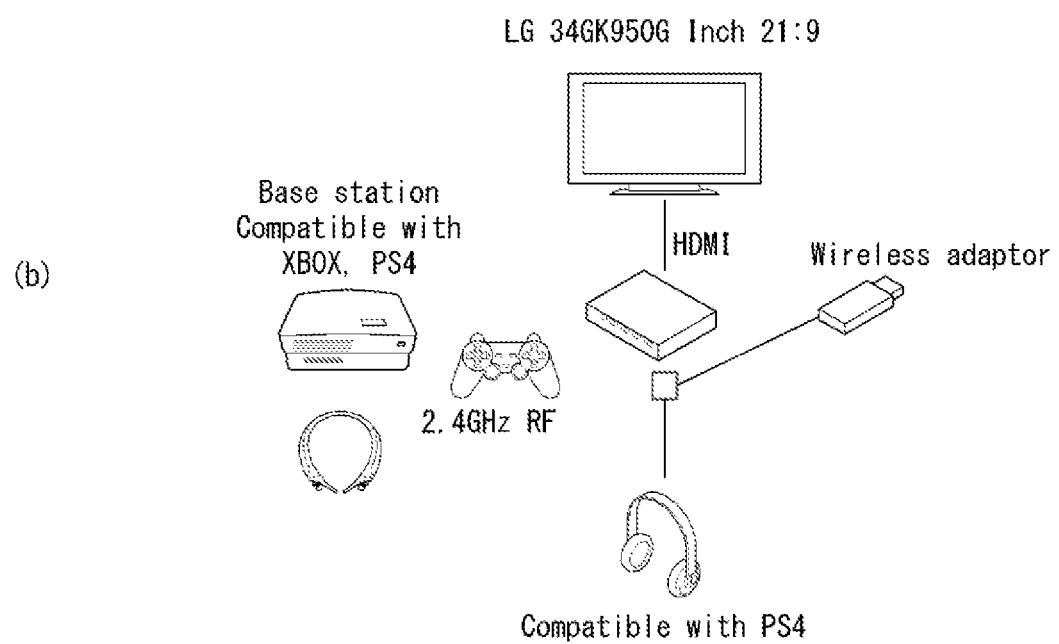

[FIG. 28]
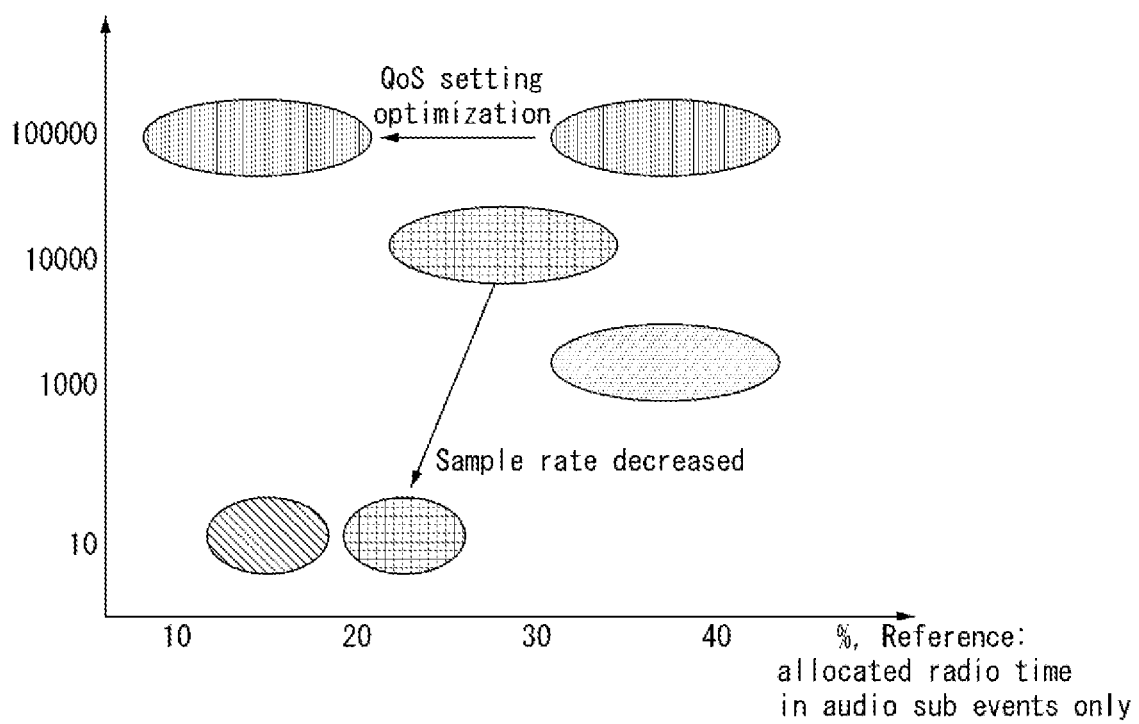

[FIG. 29]
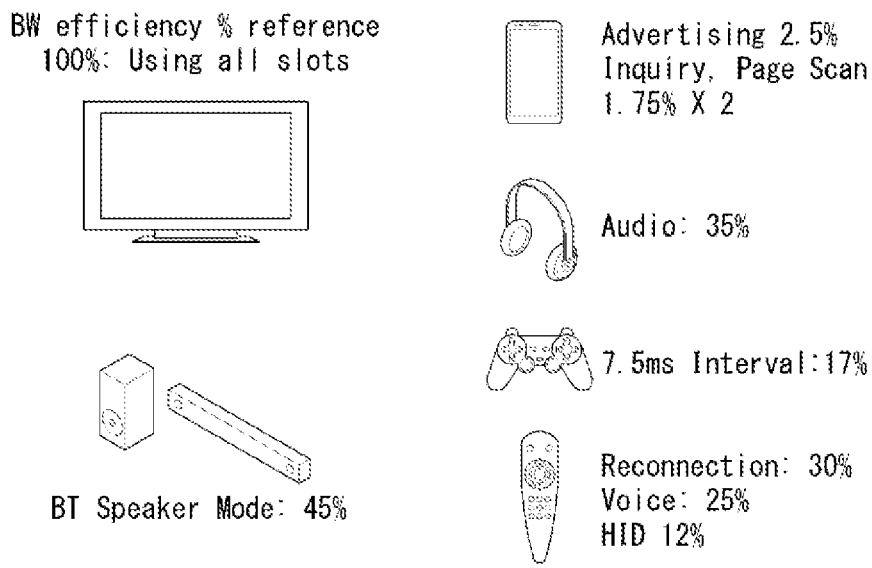
[FIG. 30]
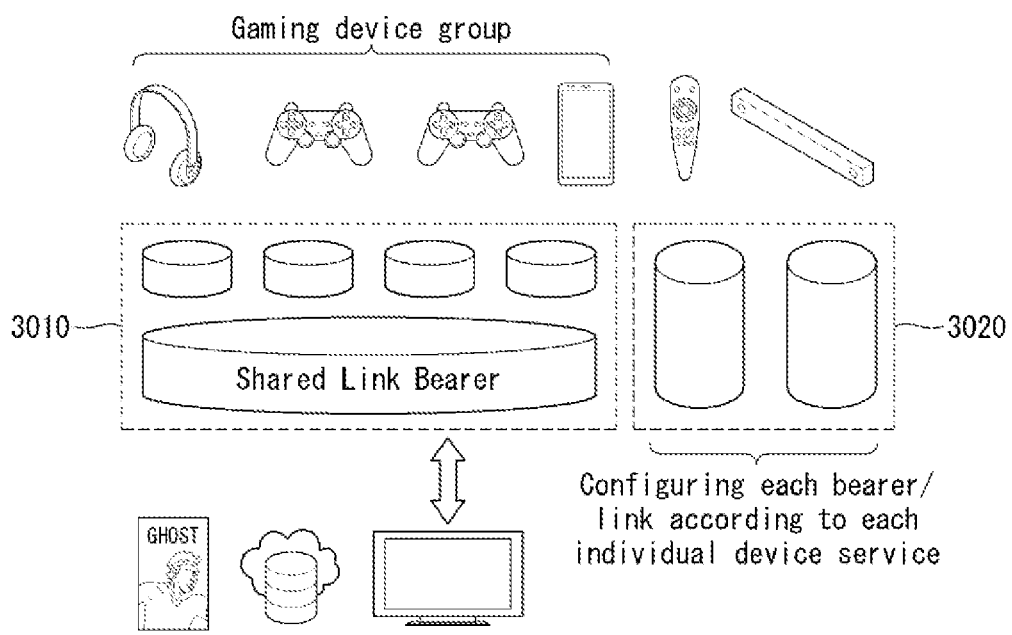

[FIG. 31]
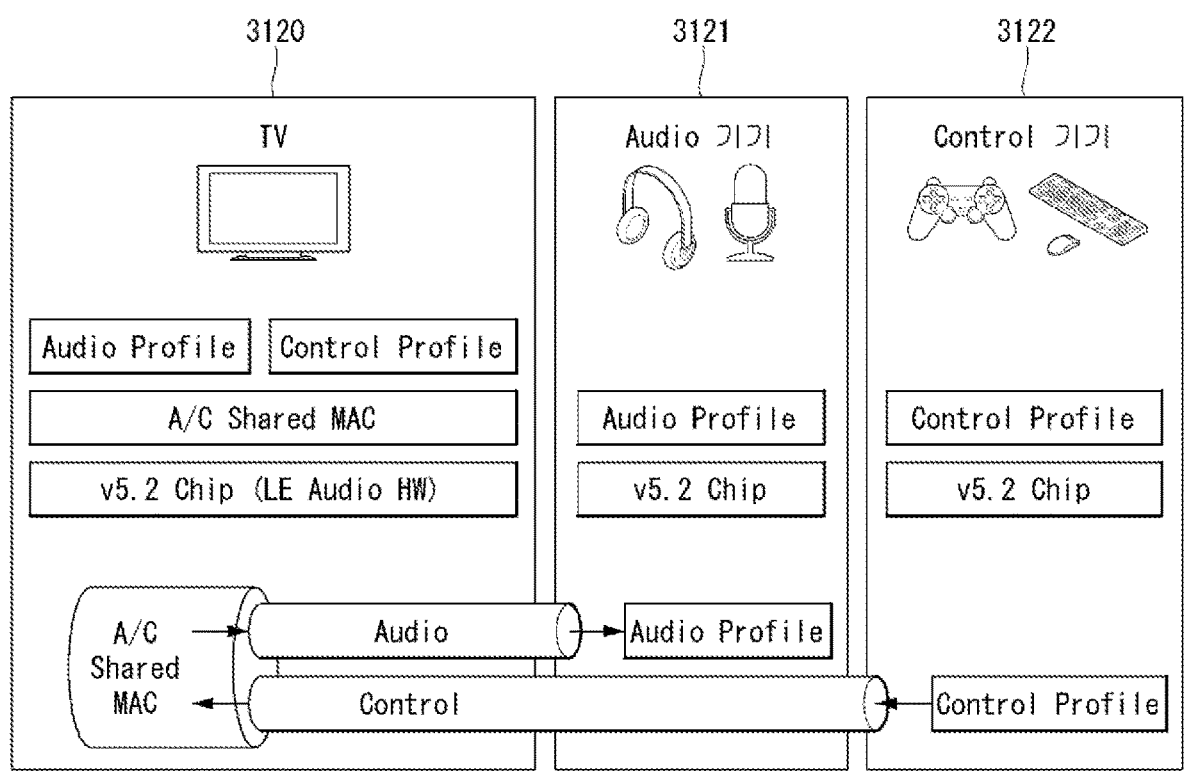

[FIG. 32]
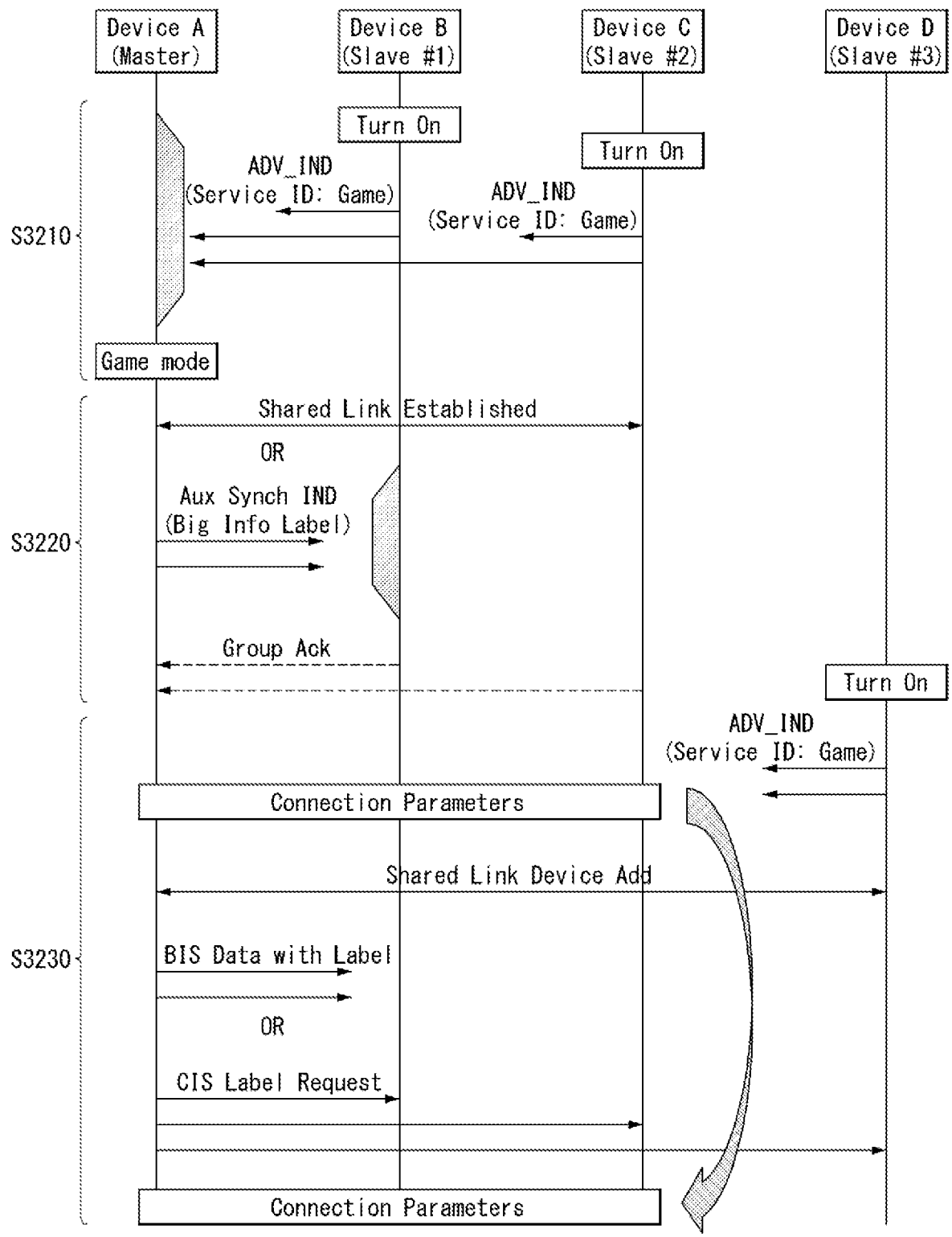

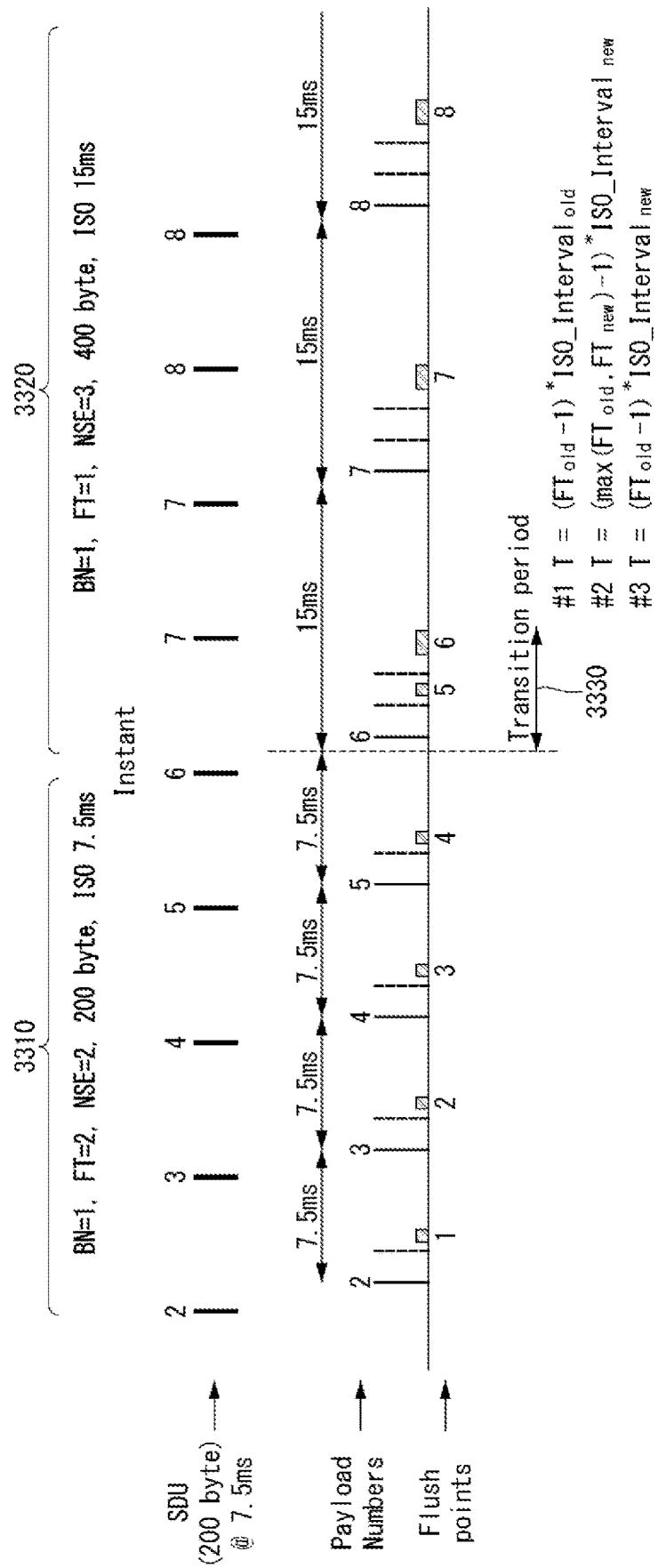
[FIG. 33]

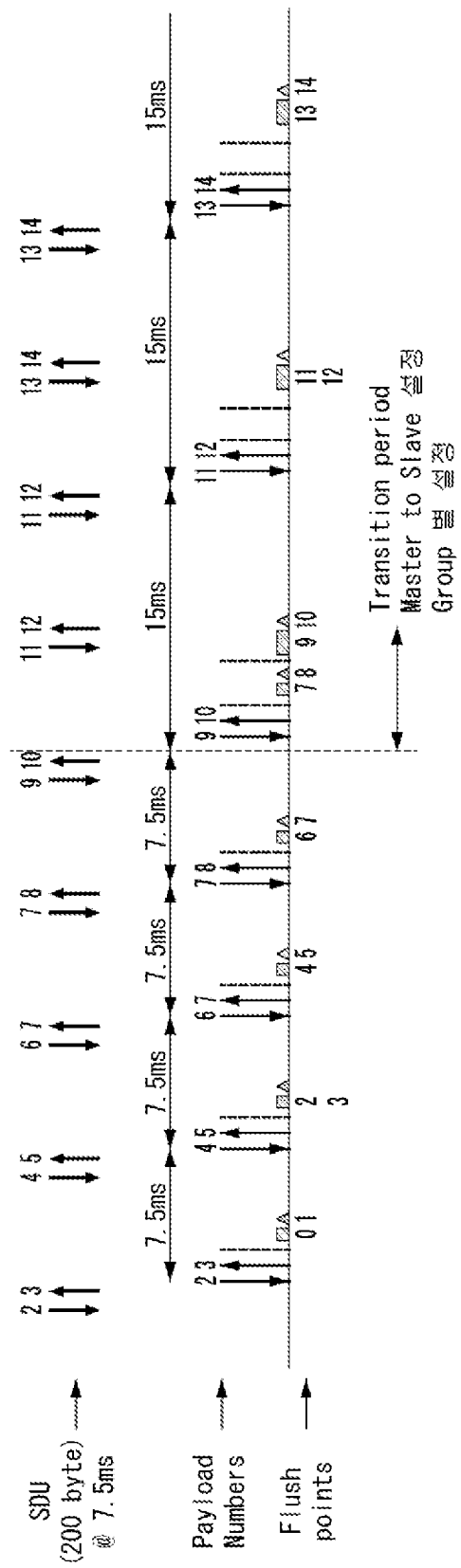

[FIG. 35]

Grouped sub frame

| Header | | | | Payload |
|---|---|---|---|---|
| Group Address | Link ID | Frame Assigned ID | Data Type | Audio Data, Control Data |

[FIG. 36]
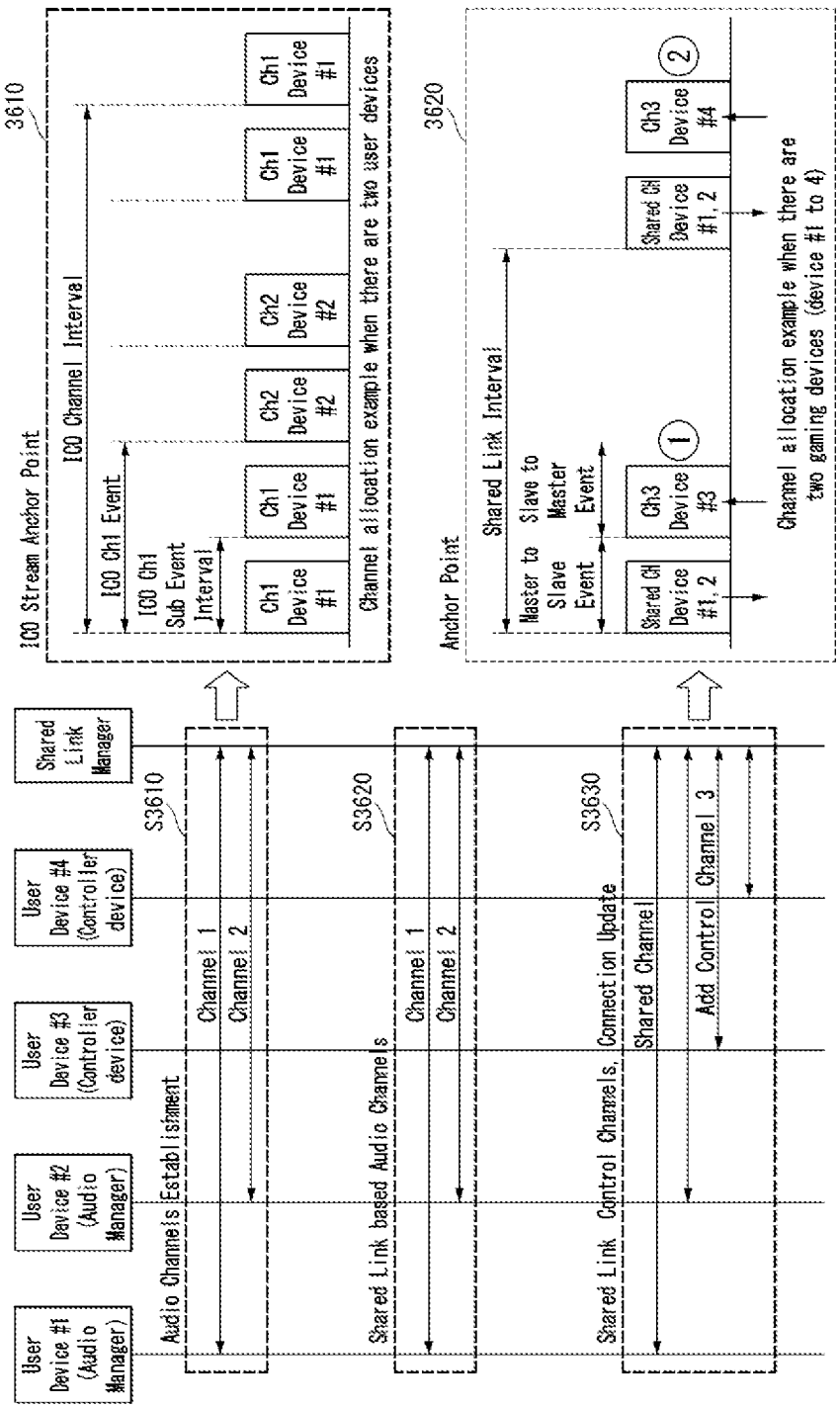

[FIG. 37]
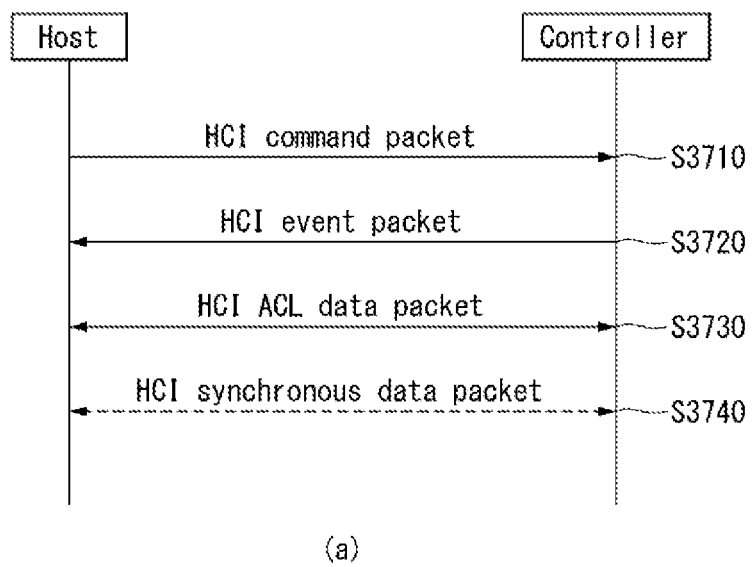
(a)
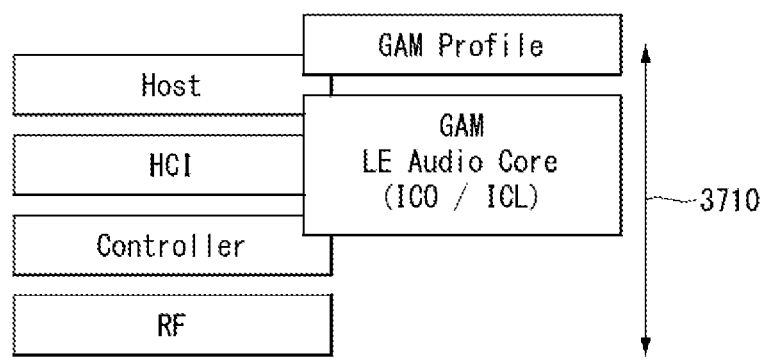
(b)

[FIG. 38]
| Event | Event Code | Event Parameters |
|---|---|---|
| HCI_LE_CIS_Request | 0x3E | Subevent_Code, ACL_Connection_Handle, CIS_Connection_Handle, CIG_ID, CIS_ID, Iso_Interval, NSE, Payload_Size_M_TO_S, Payload_Size_S_TO_M, PHY_M_TO_S, PHY_S_TO_M, FT_M_TO_S, FT_S_TO_M, BN_M_TO_S, BN_S_TO_M, |
[FIG. 39]
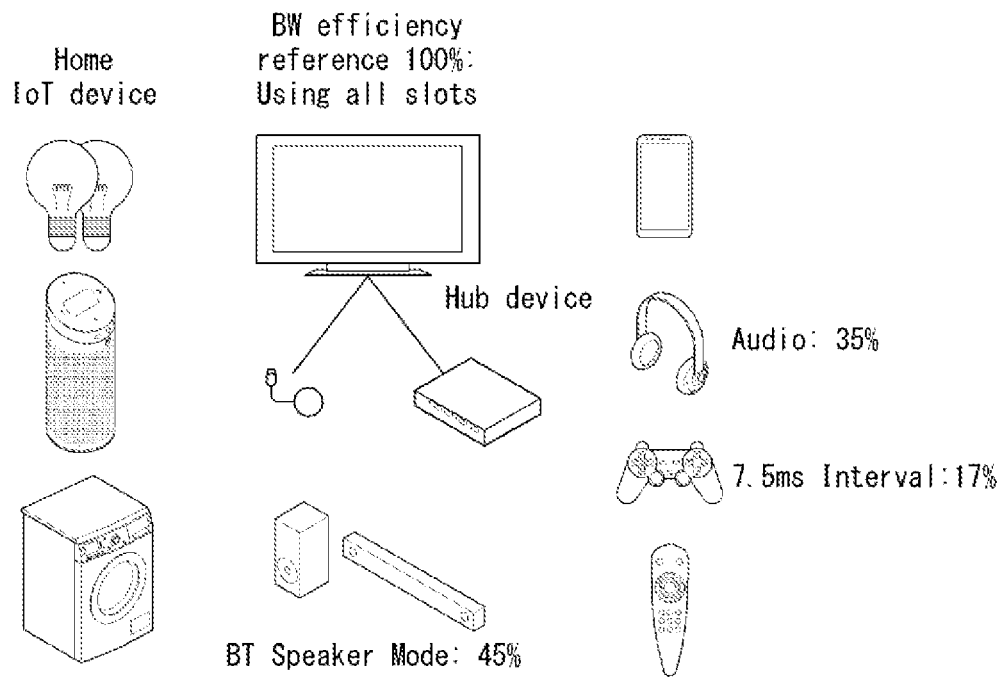

[FIG. 40]
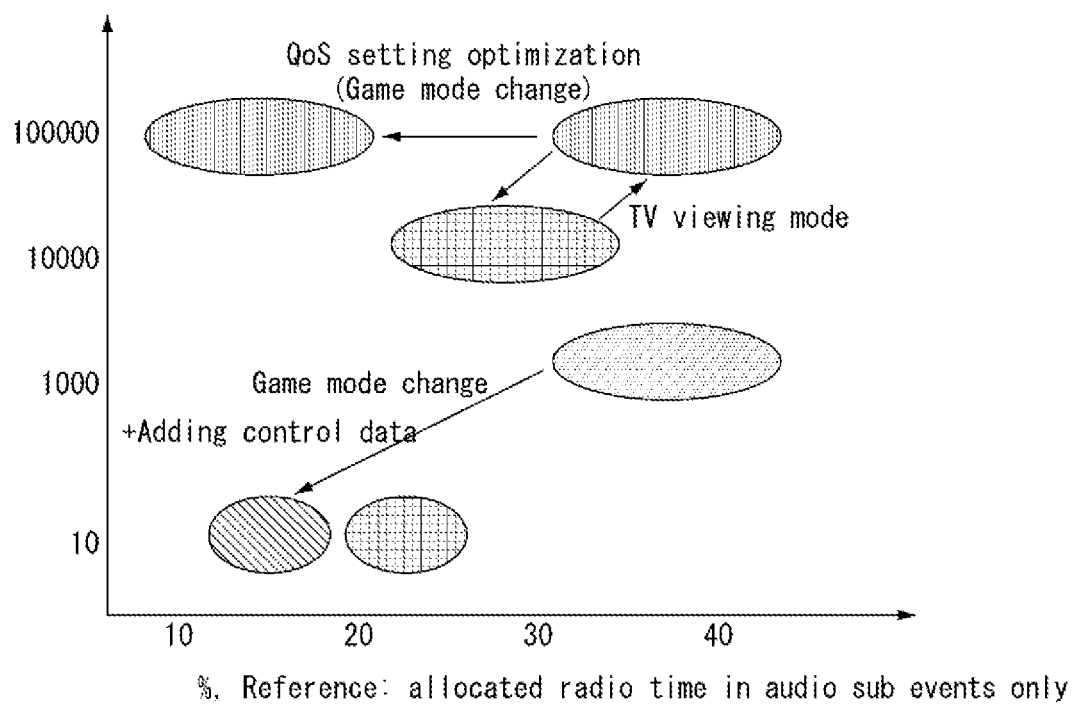
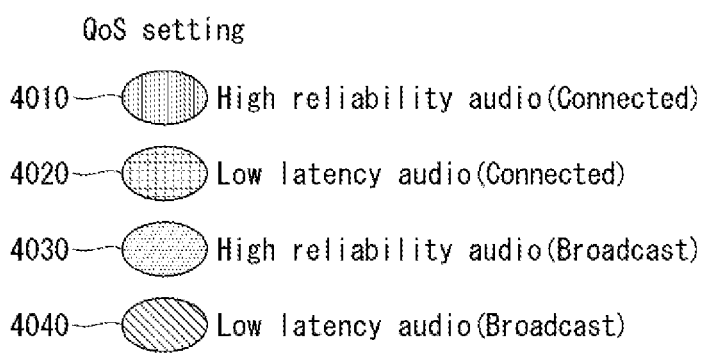

[FIG. 41]
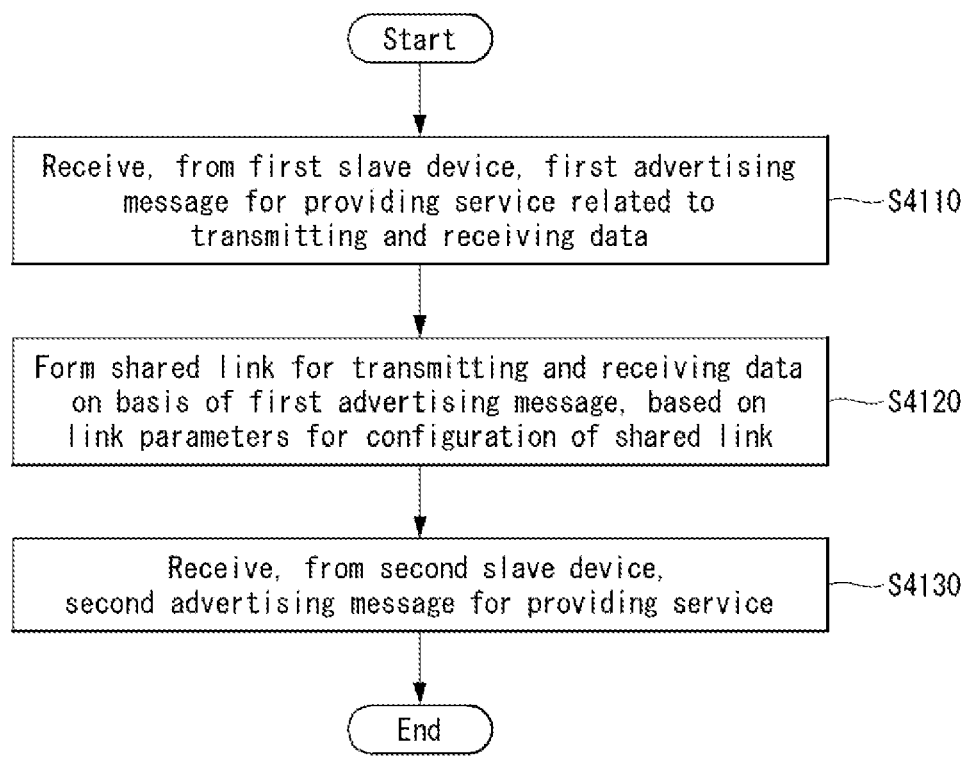

METHOD FOR TRANSMITTING AND RECEIVING DATA AND DEVICE FOR SAME IN SHORT-RANGE WIRELESS COMMUNICATION SYSTEM

CROSS-REFERENCE TO RELATED APPLICATIONS

This application is the National Stage filing under 35 U.S.C. 371 of International Application No. PCT/KR2021/018880, filed on Dec. 13, 2021, which claims the benefit of earlier filing date and right of priority to Korean Application No. 10-2020-0173288, filed on Dec. 11, 2020, the contents of which are all hereby incorporated by reference herein in their entireties.

TECHNICAL FIELD

The present disclosure relates to a method for transmitting and receiving data and a device for the same in a short-range wireless communication system, and more particularly, to a method for transmitting and receiving audio data/control data using Bluetooth technology and a device for the same in a short-range wireless communication system.

BACKGROUND ART

Bluetooth is a near field communication (NFC) technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device based on a Bluetooth communication method intended to be used using the Bluetooth device, and subsequently pre-establish a connection.

Bluetooth communication methods include a basic rate/enhanced data rate (BR/EDR) method and a low energy (LE) method which is a low power method. The BR/EDR method may be referred to as Bluetooth Classic. The Bluetooth classic method includes a Bluetooth technology that has been continued from Bluetooth 1.0 using a basic rate and a Bluetooth technology using an enhanced data rate supported since Bluetooth 2.0.

The Bluetooth low energy (BLE) technology has been applied since Bluetooth 4.0 and may stably provide information of hundreds of kilobytes (KB) by consuming low energy. The BLE technology exchanges information between devices by utilizing an attribute protocol. This BLE method may reduce energy consumption by reducing overhead of a header and simplifying an operation.

Some Bluetooth devices do not have a display or a user interface. Complexity of connection/management/control/disconnection between various kinds of Bluetooth devices and Bluetooth devices employing similar technologies has increased.

Further, although Bluetooth may achieve a relatively high speed at a relatively low power and low cost, a transmission distance is generally limited to a maximum of 100 m, and thus, Bluetooth is suitable for use in a limited space.

DISCLOSURE

Technical Problem

An object of the present disclosure is to provide a method for transmitting and receiving data and a device for the same in a short-range wireless communication system.

Further, an object of the present disclosure is to provide a method for transmitting and receiving, with respect to data, audio data and control data through audio data and control data through one link and a device for the same in the short-range wireless communication system.

Further, according to the present disclosure, an object of the present disclosure is to provide a method for configuring a parameter for a link configuration based on characteristics for a link for data transmission from a slave device to a master device and a link for data transmission from the master device to the slave device, and a device for the same.

Further, an object of the present disclosure is to provide a method for changing the parameter for the link configuration based on the characteristics for the link for the data transmission from the slave device to the master device and the link for the data transmission from the master device to the slave device, and a device for the same.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure provides a method for transmitting and receiving data in a short-range wireless communication system and a device therefor.

More specifically, in the present disclosure, a method for transmitting and receiving, by a master device, data in a short-range wireless communication system includes: receiving, from a first slave device, a first advertising message for providing a service related to transmitting and receiving the data; forming a shared link for transmitting and receiving the data based on the first advertising message, based on a link parameter for a configuration of the shared link, in which the shared link includes (i) a first link for data transmission from the master device to a slave device, and (ii) a second link for data transmission from the slave device to the master device; and receiving, from a second slave device, a second advertising message for providing the service, and the link parameters applied to the shared link is updated in order to add the second slave device as a slave device related to the shared link based on the second advertising message, and the updated link parameters are configured as different values for each of (i) the first link and (ii) the second link based on the characteristics of the first and second links.

In addition, in the present disclosure, the data transmitted on the first link and the data transmitted on the second link are different types of data.

In addition, in the present disclosure, the data transmitted on the first link is audio data related to the service.

In addition, in the present disclosure, the data transmitted on the second link is control data related to the service, and the control data is generated based on a user input into the slave device.

In addition, in the present disclosure, the audio data is transmitted based on a broadcast or multicast scheme.

In addition, in the present disclosure, when the second slave device is added as the slave device related to the shared link, the audio data is transmitted based on grouping for the first slave device and the second slave device, and a group address for transmission of the audio data is allocated to the grouped first slave and second slave device.

In addition, in the present disclosure, the link parameters include (i) a first parameter for the maximum number of CIS events which may be used for transmission of connected isochronous stream (CIS) data packet data unit (PDU) and (ii) a second parameter for the number of new payloads for each broadcast isochronous stream (BIS) of a BIS event.

In addition, in the present disclosure, a value of the first parameter applied to the first link is configured to a value smaller than the value of the first parameter applied to the second link.

In addition, in the present disclosure, a value of the second parameter applied to the second link is determined in proportion to the number of slave devices related to the second link.

In addition, in the present disclosure, each of the first advertising message and the second advertising message includes identification information for the service.

In addition, in the present disclosure, the method further includes changing an operation mode of the master device to a specific operation mode for providing the service based on the identification information.

In addition, in the present disclosure, the method further includes transmitting, to the first slave device, a request message for requesting the update of the link parameter.

In addition, in the present disclosure, the request message is configured based on a CIS label request.

In addition, in the present disclosure, the request message is configured based on BIS data with label.

In addition, in the present disclosure, a master device for transmitting and receiving data in a short-range wireless communication system includes: a transmitter for transmitting a radio signal; a receiver for receiving the radio signal; at least one processor; and at least one computer memory operably connectable to the at least one processor, and storing instructions of performing operations when executed by the at least one processor, and the operations include receiving, from a first slave device, a first advertising message for providing a service related to transmitting and receiving the data, forming a shared link for transmitting and receiving the data based on the first advertising message, based on a link parameter for a configuration of the shared link, in which the shared link includes (i) a first link for data transmission from the master device to a slave device, and (ii) a second link for data transmission from the slave device to the master device, and receiving, from a second slave device, a second advertising message for providing the service, and the link parameter applied to the shared link is updated in order to add the second slave device to a slave device related to the shared link based on the second advertising message, and the updated link parameters are configured as different values for each of (i) the first link and (ii) the second link based on the characteristics of the first and second links.

Advantageous Effects

According to the present disclosure, there is an effect in that data can be transmitted and received in a short-range wireless communication system.

Further, according to the present disclosure, there is an effect in that with respect to the data, audio data and control data can be transmitted and received through one link in the short-range wireless communication system.

Further, according to the present disclosure, there is an effect in that a parameter for a link configuration can be configured based on characteristics for a link for data transmission from a slave device to a master device and a link for data transmission from the master device to the slave device.

Further, according to the present disclosure, there is an effect in that the parameter for the link configuration can be changed based on the characteristics for the link for the data transmission from the slave device to the master device and the link for the data transmission from the master device to the slave device.

Further, there is an effect in that since the parameter for the link configuration is configured/changed based on the characteristics for the link for the data transmission from the slave device to the master device and the link for the data transmission from the master device to the slave device, an appropriate parameter configuration can be performed for each of the link for the data transmission from the slave device to the master device and the link for the data transmission from the master device to the slave device.

Further, according to the present disclosure, there is an effect in that when the parameter for the link configuration is changed based on the characteristics for the link for data transmission from the slave device to the master device and the link for data transmission from the master device to the slave device, the parameter for the link configuration can be changed with a seamless link.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

FIG. 1 is a schematic diagram illustrating an example of a wireless communication system using Bluetooth low energy technology proposed by the present disclosure.

FIG. 2 illustrates an example of an internal block diagram of a device capable of implementing methods proposed by the present disclosure.

FIG. 3 illustrates an example of a Bluetooth communication architecture to which the methods proposed by the present disclosure may be applied.

FIG. 4 illustrates an example of a structure of a generic attribute profile (GATT) of Bluetooth low power energy.

FIG. 5 is a flowchart showing an example of a connection procedure method in the Bluetooth low power energy technology to which the present disclosure may be applied.

FIG. 6 illustrates an example of a protocol stack to which a method proposed by the present disclosure may be applied.

FIG. 7 illustrates an example of a data packet format which may be used in the protocol stack to which the method proposed by the present disclosure may be applied.

FIG. 8 is a diagram illustrating examples of Bluetooth LE audio data transmission.

FIGS. 9 and 10 are diagrams illustrating an example of Bluetooth data transmission according to ICO.

FIGS. 11 and 12 are diagrams illustrating an example of the Bluetooth data transmission according to ICL.

FIG. 13 is a diagram illustrating an example of a packet structure for supporting connection parameter update.

FIG. 14 is a diagram illustrating an example in which data transmission/reception is performed according to connection parameters.

FIG. 15 is a diagram illustrating an example in which data transmission through a broadcast scheme and a response to transmitted data are performed.

FIG. 16 is a flowchart showing an example in which the connection parameter update is performed.

FIGS. 17 and 18 are diagrams illustrating an example in which update of connection parameters is performed.

FIGS. 19 and 20 are diagrams illustrating another example in which the update of the connection parameters is performed.

FIGS. 21 and 22 are diagrams illustrating yet another example in which the update of the connection parameters is performed.

FIGS. 23 and 24 are diagrams illustrating still yet another example in which the update of the connection parameters is performed.

FIG. 25 is a diagram illustrating still yet another example in which the update of the connection parameters is performed.

FIG. 26 is a flowchart showing an example in which the connection parameter update is performed.

FIG. 27 is a diagram illustrating an example of a configuration of a cloud game system using a short-range wireless communication.

FIG. 28 is a diagram illustrating an example of a Basic Audio Profile QoS configuration.

FIG. 29 is a diagram illustrating an example of bandwidth usage of devices constituting a short-distance wireless communication system.

FIGS. 30 and 31 are diagrams illustrating an example of a method for configuring a shared link in a short-range wireless communication system proposed by the present disclosure.

FIG. 32 is a flowchart showing an example of a method for configuring a shared link in a short-range wireless communication system proposed by the present disclosure.

FIG. 33 is a diagram illustrating an example of a connection parameter update method proposed by the present disclosure.

FIG. 34 is a diagram illustrating an example of a connection parameter update method proposed by the present disclosure.

FIG. 35 is a diagram illustrating an example of a data packet structure used for connection parameter update proposed by the present disclosure.

FIG. 36 is a diagram illustrating another example in which the connection parameter update method proposed by the present disclosure is performed.

FIGS. 37 and 38 are diagrams illustrating an example of an HCI command for supporting a method proposed by the present disclosure.

FIGS. 39 and 40 are diagrams illustrating an example of a mode configuration method considering a device type and QoS.

FIG. 41 is a diagram illustrating an example in which a method for transmitting and receiving data proposed by the present disclosure is performed.

MODE FOR DISCLOSURE

In order to help understanding of the present disclosure, the accompanying drawings which are included as a part of the Detailed Description provide embodiments of the present disclosure and describe the technical features of the present disclosure together with the Detailed Description. Like reference numerals principally designate like elements throughout the present disclosure. Further, in describing the present disclosure, a detailed explanation of known related technologies may be omitted to avoid unnecessarily obscuring the subject matter of the present disclosure. Further, it is noted that the accompanying drawings are only for easily understanding the spirit of the present disclosure and it should not be interpreted that the spirit of the present disclosure is limited by the accompanying drawings.

Hereinafter, a method and an apparatus related with the present disclosure will be described in more detail with reference to drawings. In addition, a general term used in the present disclosure should be interpreted as defined in a dictionary or contextually, and should not be interpreted as an excessively reduced meaning. Further, a singular form used in the present disclosure may include a plural form if there is no clearly opposite meaning in the context. In the present disclosure, a term such as "comprising" or "including" should not be interpreted as necessarily including all various components or various steps disclosed in the present disclosure, and it should be interpreted that some component or some steps among them may not be included or additional components or steps may be further included. Suffixes "unit", "module", and "section" for components used in the following description are given or mixed in consideration of easy preparation of the present disclosure only and do not have their own distinguished meanings or roles. The terms "first," "second,", and the like are used to differentiate a certain component from other components, but the scope should not be construed to be limited by the terms.

FIG. 1 is a schematic diagram illustrating an example of a wireless communication system using Bluetooth low energy (BLE) technology to which the present disclosure may be applied.

A wireless communication system 100 includes at least one server device 120 and at least one client device 110.

The server device and the client device perform Bluetooth communication using a BLE technology. The server device and the client device perform Bluetooth communication using a BLE technology.

First, BLE technology has a relatively small duty cycle, may be produced at low cost, and significantly reduces power consumption through a low data rate, and thus, it is possible to operate for more than a year in the case of using a coin cell battery, compared to Bluetooth basic rate/enhanced data rate (BR/EDR) technology.

In addition, the BLE technology simplifies a connection process between devices, and a packet size is smaller than that of the Bluetooth BR/EDR technology.

In BLE technology, (1) the number of RF channels is 40, (2) 1 Mbps is supported as a data rate, (3) topology is a scatternet structure, (4) latency is 3 ms, and (5) a maximum current is 15 mA or less, (6) output power is 10 mW (10 dBm) or less, and (7) the BLE technology is mainly used in applications such as mobile phones, watches, sports, healthcare, sensors, device control, and the like.

The server device 120 may operate as a client device in a relationship with other devices, and the client device may operate as a server device in a relationship with other devices. That is, in the BLE communication system, any one device may operate as a server device or a client device, and may operate as both a server device and a client device, if necessary.

The server device 120 may be represented as a data service device, a slave device, a slave, a server, a conductor, a host device, a gateway, a sensing device, a monitoring device, a first device, a second device and the like.

the client device 110 may be represented as a master device, a master, a client, a member, a sensor device, a sink device, a collector, a third device, a fourth device, and the like.

The server device and the client device correspond to main components of the wireless communication system, and the wireless communication system may include other components in addition to the server device and the client device.

The server device refers to a device which is provided with data from the client device, directly communicates with the client device, and provides data to the client device through a response when a data request is received from the client.

In addition, the server device sends a notification message and an indication message to the client device to provide data information to the client device. In addition, when the server device transmits the indication message to the client device, the server device receives a confirmation message corresponding to the indication message from the client.

In addition, in the process of transmitting and receiving the notification message, the indication message, and the confirmation message to and from the client device, the server device may provide data information to a user through a display unit or may receive a request input from a user through a user input interface.

In addition, the server device may read data from a memory unit or write new data to the corresponding memory in the process of transmitting and receiving a message to and from the client device.

In addition, one server device may be connected to a plurality of client devices and may be easily reconnected (or connected) with client devices by using bonding information.

The client device 120 refers to a device that requests data information and data transmission from the server device.

The client device receives data from the server device through the notification message, the indication message, and the like, and when the indication message is received from the server device, the client device sends a confirmation message in response to the indication message.

Similarly, the client device may provide information to the user through an output unit or receive an input from the user through the input unit in the process of transmitting and receiving a message to and from the server device.

In addition, the client device may read data from a memory or write new data into the corresponding memory in the process of transmitting and receiving a message to and from the server device.

Hardware components such as the output unit, the input unit, and the memory of the server device and the client device will be described in detail with reference to FIG. 2.

In addition, the wireless communication system may configure personal area networking (PAN) through Bluetooth technology. For example, in the wireless communication system, files, documents, and the like may be exchanged quickly and safely by establishing a private piconet between devices.

FIG. 2 illustrates an example of an internal block diagram of a device which is available to implement the methods proposed in the present disclosure.

As illustrated in FIG. 2, a master device 110 includes a user input interface 112, a power supply unit 113, a control unit 114, a memory unit 115, a network interface 116 including a Bluetooth interface, a storage 117, a display unit 118, and a multi media module 119.

The user input interface 112, the power supply unit 113, the control unit 114, the memory unit 115, the network interface 116 including the Bluetooth interface, the storage 117, the display unit 118, and the multi media module 119 are functionally connected to each other to perform the method proposed in the present disclosure.

Further, as illustrated in FIG. 2, slave devices #1 and #2 120 include a user input interface 122, a power supply unit 123, a control unit 124, a memory unit 125, a network interface 126 including a Bluetooth interface, a storage 127, a display unit 128, and a multi media module 129.

The user input interface 122, the power supply unit 123, the control unit 124, the memory unit 125, the network interface 126 including the Bluetooth interface, the storage 127, the display unit 128, and the multi media module 129 are functionally connected to each other to perform the method proposed in the present disclosure.

The network interface 116, 126 refers to a unit (or module) capable of transmitting a request/response, command, notification, indication/confirm message, or data between devices using the Bluetooth technology.

The memory 115, 125 is implemented in various types of devices and refers to a unit in which various data is stored. Further, the storages 117 and 127 refer to units that perform a similar function to a memory.

The control units 114 and 124 refer to modules that control an overall operation of the master device 110 or the slave device 120, and request to transmit a message through a network interface or control to process a received message.

The control units 114 and 124 may include an application-specific integrated circuit (ASIC), another chipset, a logic circuit, and/or a data processing device.

The memory units 115 and 125 may include a read-only memory (ROM), a random access memory (RAM), a flash memory, a memory card, a storage medium, and/or other storage devices.

The memory units 115 and 125 may be positioned inside or outside the processors 114 and 124 and connected with the processors 114 and 124 by various well-known means.

The display units 118 and 128 refer to modules for providing state information of the device and message exchange information to the user through a screen.

The power supply units 113 and 123 refer to modules that receive external power and internal power under the control of the control unit and supply power required for operating each of the components.

As described above, the BLE technology may have a small duty cycle and significantly reduce power consumption through low data rate.

FIG. 3 illustrates an example of a Bluetooth communication architecture to which methods proposed by the present disclosure may be applied.

Specifically, FIG. 3 illustrates an example of an architecture of Bluetooth low energy (LE).

As shown in FIG. 3, the BLE structure includes a controller stack capable of processing a wireless device interface for which timing is critical and a host stack capable of processing high level data.

The controller stack may also be called a controller. In order to avoid confusion with the processor, that is, an internal element of the device described with reference to FIG. 2, however, the controller stack may be preferably used below.

First, the controller stack may be implemented using a communication module which may include a Bluetooth wireless device and a processor module which may include a processing device, such as a microprocessor.

The host stack may be implemented as part of an OS operating on the processor module or as a package instance on an OS.

In some cases, the controller stack and the host stack may operate or may be performed on the same processing device within the processor module.

The host stack includes a generic access profile (GAP) 310, GATT based profiles 320, a generic attribute profile (GATT) 330, an attribute protocol (ATT) 340, a security manager (SM) 350, and a logical link control and adaptation protocol (L2CAP) 360. The host stack is not limited to the aforementioned composition, but may include various protocols and profiles.

The host stack multiplexes various protocols and profiles provided by that Bluetooth disclosure using the L2CAP.

First, the L2CAP 360 provides one bilateral channel for sending data to according to a specific protocol or specific profile.

The L2CAP is capable of multiplexing data between upper layer protocols, segmenting or reassembling packages, and managing multicast data transmission.

BLE uses three fixed channels for respective signaling, a security manager, and an attribute protocol.

BR/EDR uses a dynamic channel and supports a protocol service multiplexer, retransmission, streaming mode.

The SM 350 authenticates a device, which is a protocol for providing a key distribution.

The ATT 340 relies on a server-client structure, which defines rules for a corresponding device for data access. Six message types are defined: Request, Response, Command, Notification, Indication, and Confirmation.

① Request and Response message: the Request message is used when a client device requests specific information from a server device, and the Response message is used in response to a Request message, which is transmitted from the server device to the client device.

② Command message: The Command message is transmitted from a client device to a server device in order to indicate a command for a specific operation, but the server device does not send a response to a Command message to the client device.

③ Notification message: A server device sends this message to a client device in order to provide notification of an event, but the client device does not send a confirmation message to the server device in response to a Notification message.

④ Indication and Confirm message: A server device sends this message to a client device in order to provide notification of an event. Unlike in the Notification message, the client device sends a Confirm message to the server device in response to an Indication message.

The generic access profile (GAP) is a layer newly implemented to support the BLE technology, and is used to control the selection of a role for communication between BLE devices and a multi-profile operation.

The GAP is mainly used for device discovery, connection establishment, and security. That is, the GAP defines a method for providing information to a user and also defines the following attribute types.

① Service: A combination of actions related to data, and it defines the basic operation of a device.

② Include: Define a relationship between services.

③ Characteristics: A data value used by a service

④ Behavior: A format that may be readable by a computer, which is defined by a Universal Unique Identifier (UUID) and a value type.

The GATT-based profiles are dependent on the GATT and are mainly applied to BLE devices. The GATT-based profiles may include Battery, Time, FindMe, Proximity, Object Delivery Service and so on. More specific descriptions of the GATT-based profiles are as follows.

Battery: A method for exchanging battery information.

Time: A method for exchanging time information.

FindMe: A method for providing an alarm service according to the distance.

Proximity: A method for exchanging battery information.

Time: A method for exchanging time information

The GATT may be used as a protocol by which to describe how the ATT is utilized at the time of composing services. For example, the GATT may be used to define how the ATT profiles are grouped together with services and to describe characteristics associated with the services.

Therefore, the GATT and the ATT describe device statuses and services, and how features are associated with each other and how they are used.

The controller stack includes a physical layer 390, a link layer 380, and a host controller interface 370.

The physical layer 390 (or a wireless transmission and reception module) sends and receives radio signals of 2.4 GHz, and uses GFSK modulation and frequency hopping utilizing 40 RF channels.

The link layer 380 sends or receives Bluetooth packets.

Furthermore, the link layer establishes a connection between devices after performing the advertising and scanning function using three advertising channels, and provides a function of exchanging a maximum of 42 bytes of data packets through 37 data channels.

The host controller interface (HCI) provides an interface between the host stack and the controller stack so that the host stack may provide commands and data to the controller stack and the controller stack may provide events and data to the host stack.

Hereinafter, the procedure of BLE is described briefly.

The BLE procedure includes a device filtering procedure, an advertising procedure, a scanning procedure, a discovering procedure, and a connecting procedure.

Device Filtering Procedure

The device filtering procedure functions to reduce the number of devices which perform responses to requests, commands, or notification in the controller stack.

All of devices may not need to respond to received requests. Accordingly, the controller stack reduces the number of transmitted requests so that power consumption may be reduced in the BLE controller stack.

An advertising device or a scanning device may perform the device filtering procedure in order to restrict the number of devices which receive advertisement packets, scan requests, or connection requests.

In this case, the advertising device refers to a device which sends an advertisement event, that is, a device which performs advertisement, and is also called an advertiser.

A scanning device refers to a device which performs scanning, that is, a device which sends a scan request.

In the BLE disclosure, if a scanning device receives part of advertisement packets from an advertising device, the scanning device has to send a scan request to the advertising device.

If the transmission of a scan request is not required as the device filtering procedure is used, however, the scanning device may ignore advertisement packets transmitted by an advertising device.

The device filtering procedure may be used even in the connection request procedure. If device filtering is used for the connection request procedure, the need for sending a response to a connection request may be made unnecessary by ignoring the connection request.

Advertising Procedure

An advertising device performs an advertisement procedure to perform non-directional broadcast using the devices within the range of the advertising device.

In this case, the non-directional broadcast refers to broadcast in all directions rather than broadcast in specific directions.

Unlike the non-directional broadcast, the directional broadcast refers to broadcast in a specific direction. Non-directional broadcast is performed without involving a connection procedure between devices in a listening state (hereinafter referred to as a "listening device").

The advertising procedure is used to establish a BLE to a nearby initiating device.

In some embodiments, the advertising procedure may be used to provide the periodic broadcast of user data to scanning devices which perform listening through an advertising channel.

In the advertising procedure, all of advertisements (or advertisement events) are broadcasted through an advertising physical channel.

An advertising device may receive a scan request from a listening device which performs a listening operation in order to obtain additional user data from the advertising device. In response to the scan request, the advertising device sends a response to the listening device which has sent the scan request through the same advertising physical channel through which the advertising device has received the scan request.

While broadcast user data sent as part of advertising packets forms dynamic data, scan response data is static for the most part.

An advertising device may receive a connection request from an initiating device through an advertising (or broadcast) physical channel. If the advertising device has used a connectable advertisement event and the initiating device has not been filtered by a filtering procedure, the advertising device stops an advertisement and enters connected mode. The advertising device may resume the advertisement after entering the connected mode.

Scanning Procedure

A device performing a scan operation, that is, a scanning device, performs a scanning procedure in order to listen to the non-directional broadcast of user data from advertising devices which use an advertising physical channel.

In order to request additional user data, a scanning device sends a scan request to an advertising device through an advertising physical channel. In response to the scan request, the advertising device includes additional user data requested by the scanning device in a scan response and sends the scan response to the scanning device through the advertising physical channel.

The scanning procedure may be used while a scanning device is connected to another BLE device in a BLE piconet.

If a scanning device receives a broadcast advertising event and stays in initiator mode where a connection request may be initiated, the scanning device may initiate BLE for an advertising device by sending a connection request to the advertising device through an advertising physical channel.

If a scanning device sends a connection request to an advertising device, the scanning device stops the entire scanning for additional broadcast and enters connected mode.

Discovering Procedure

Devices capable of Bluetooth communication (hereinafter referred to as "Bluetooth devices") perform an advertising procedure and a scanning procedure in order to discover devices around the Bluetooth devices or devices to be discovered by other devices within a given area.

The discovering procedure is performed in an asymmetric manner. A Bluetooth device searching for another Bluetooth device nearby is called a discovering device, and performs listening in order to search for devices that advertise advertisement events that may be scanned. A Bluetooth device which may be discovered and used by another device is called a discoverable device. A discoverable device actively broadcasts an advertisement event so that other devices may scan the discoverable device through an advertising (or broadcast) physical channel.

Both of the discovering device and the discoverable device may already have been connected to other Bluetooth devices in a piconet.

Connecting Procedure

A connecting procedure is asymmetric. In the connecting procedure, while a particular Bluetooth device performs an advertising procedure, other Bluetooth devices need to perform a scanning procedure.

In other words, the advertising procedure may be a primary task to be performed, and as a result, only one device may respond to an advertisement. After receiving a connectable advertisement event from an advertising device, the connecting procedure may be initiated by sending a connection request to the advertising device through an advertising (or broadcast) physical channel.

Operation statuses defined in the BLE technology, that is, an advertising state, a scanning state, an initiating state, and a connection state, are described briefly below.

Advertising State

The link layer (LL) enters the advertising state in a command from a host (or stack). If the link layer is in the advertising state, the link layer sends advertising packet data units (PDUs) at advertisement events.

Each advertisement event includes at least one advertising PDU, and the advertising PDU is transmitted through an advertising channel index. Each advertisement event may be previously closed if the advertising PDU is transmitted through each advertising channel index, the advertising PDU is terminated, or the advertising device needs to secure the space in order to perform other functions.

Scanning State

The link layer enters the scanning state in response to a command from a host (or stack). In the scanning state, the link layer listens to advertising channel indices.

The scanning state supports two types: passive and active scanning. The host determines a scanning type.

No separate time or advertising channel index is defined to perform scanning.

In the scanning state, the link layer listens to an advertising channel index for "scanWindow" duration. scanInterval is defined as the interval between the start points of two consecutive scan windows.

If there is no scheduling collision, the link layer has to perform listening in order to complete all of the scanIntervals of scanWindows as commanded by the host. In each scanWindow, the link layer has to scan other advertising channel indices. The link layer uses all of available advertising channel indices.

Advertising Channel PDU

The advertising channel PDU includes a 16 bit header and a payload of various sizes.

The PDU type field of an advertising channel included in the header supports PDU types defined in Table 1 below.

TABLE 1

| | | | Permitted PHYs | | |
|---|---|---|---|---|---|
| PDU Type | PDU Name | Channel | LE 1M | LE 2M | LE Coded |
| 0000b | ADV_IND | Primary Advertising | ● | | |
| 0001b | ADV_DIRECT_IND | Primary Advertising | ● | | |
| 0010b | ADV_NONCONN_IND | Primary Advertising | ● | | |
| 0011b | SCAN_REQ | Primary Advertising | ● | | |
| | AUX_SCAN_REQ | Secondary Advertising | ● | ● | ● |
| 0100b | SCAN_RSP | Primary Advertising | ● | | |
| 0101b | CONNECT_IND | Primary Advertising | ● | | |
| | AUX_CONNECT_REQ | Secondary Advertising | ● | ● | ● |
| 0110b | ADV_SCAN_IND | Primary Advertising | ● | | |

In the case of passive scanning, the link layer is unable to send any packet, but only receives packets.

In the case of active scanning, the link layer performs listening to the advertising device to rely on the advertising PDU type by which additional information related to the advertising PDUs and advertising device may be requested.
Initiating State The link layer enters the initiating state in response to a command from a host (or stack).

In the initiating state, the link layer performs listening to advertising channel indices.

In the initiating state, the link layer listens to an advertising channel index for "scanWindow" duration.
Connection State The link layer enters a connection state when the device performing the connection request, i. E., the initiating device transmits CONNECT_REQ PDU to the advertising device or when the advertising device receives CONNECT_REQ PDU from the initiating device.

After entering the connections state, it is considered that the connection is created. However, it need not be considered so that the connection is established at the time of entering the connections state. An only difference between a newly created connection and the previously established connection is a link layer connection supervision timeout value.

When two devices are connected to each other, two devices play difference roles.

A link layer serving as a master is referred to as the master and a link layer serving as a slave is referred to as the slave. The master controls a timing of a connection event and the connection event refers to a time at which the master and the slave are synchronized.

Hereinafter, a packet defined the Bluetooth interface will be briefly described. BLE devices use packets defined below.
Packet Format The link layer has only one packet format used for both an advertising channel packet and a data channel packet.

Each packet is constituted by four fields, i.e., a preamble, an access address, a PDU, and a CRC.

When one packet is transmitted in an advertising physical channel, the PDU will become an advertising channel PDU and when one packet is transmitted in a data physical channel, the PDU will become a data channel PDU.

Advertising PDU

The following advertising channel PDU types are called advertising PDUs and are used for specific events.
  ADV_IND: a connectable non-directional advertisement event
  ADV_DIREC_IND: a connectable directional advertisement event
  ADV_NONCONN_IND: a non-connectable non-directional advertisement event
  ADV_SCAN_IND: a non-directional advertisement event that may be scanned The PDUs are transmitted by the link layer in the advertising state and are received by the link layer in the scanning state or initiating state.
Scanning PDUs The advertising channel PDU type below is called a scanning PDU and is used in the status described below.
  SCAN_REQ: transmitted by the link layer in the scanning state and received by the link layer in the advertising state.
  SCAN_RSP: transmitted by the link layer in the advertising state and received by the link layer in the scanning state.
Initiating PDUs The advertising channel PDU type below is called an initiating PDU.
  CONNECT_REQ: transmitted by the link layer in the initiating state and received by the link layer in the advertising state.
Data Channel PDU The data channel PDU may have a 16-bit header and various sizes of payloads and include a message integrity check (MIC) field.

The procedure, the state, the packet format, and the like in the BLE technology, which are described above, may be applied in order to perform methods proposed by the present disclosure.

FIG. 4 illustrates an example of a structure of a generic attribute profile (GATT) of Bluetooth low energy.

Referring to FIG. 4, a structure for exchanging profile data of the Bluetooth low energy may be described.

Specifically, the generic attribute profile (GATT) is a definition of a method in which data is transmitted and received by using services and characteristics between the Bluetooth LE devices.

In general, a Peripheral device (e.g., a sensor device) serves as a GATT server and has a definition of services and characteristics.

A GATT client sends a data request to the GATT server in order to read or write the data and all transactions start at the GATT client and the response is received from the GATT server.

A GATT-based operation structure used in the Bluetooth LE may be based on THE profile, the service, and the characteristic, and may have a vertical structure illustrated in FIG. 5.

The profile may be constituted by one or more services and the service may be constituted by one or more characteristics or other services.

The service may serve to divide data into logical units and include one or more characteristics or other services. Each service has a 16-bit or 128-bit separator called a Universal Unique Identifier (UUID).

The characteristic is a lowest unit in the GATT-based operation structure. The characteristic includes only one datum and has a 16-bit or 128-bit UUID similar to the service.

The characteristic is defined as a value of various information and requires one attribute to contain each information. The characteristic may adopt various consecutive attributes.

The attribute is constituted by four components, which have the following meanings.
 handle: Address of attribute
 Type: Type of attribute
 Value: Value of attribute
 Permission: Access authority to attribute FIG. 5 is a flowchart showing an example of a connection procedure method in Bluetooth low power energy technology to which the present disclosure may be applied.

A server transmits to a client an advertisement message through three advertising channels (S5010).

The server may be called an advertiser before connection and called as a master after the connection. As an example of the server, there may be a sensor (temperature sensor, etc.).

Further, the server may be called a scanner before the connection and called as a slave after the connection. As an example of the client, there may be a smartphone, etc.

As described above, in Bluetooth, communication is performed over a total of 40 channels through the 2.4 GHz band. Three channels among 40 channels as the advertising channels are used for exchanging sent and received for establishing the connection, which include various advertising packets.

The remaining 37 channels are used for data exchange after connection to the data channel.

The client may receive the advertisement message and thereafter, transmit the Scan Request message to the server in order to obtain additional data (e.g., a server device name, etc.).

In this case, the server transmits the Scan Response message including the additional data to the client in response to the Scan Request message.

Here, the Scan Request message and the Scan Response message are one type of advertising packet and the advertising packet may include only user data of 31 bytes or less.

Therefore, when there is data in which the size of the data is larger than 3 bytes, but overhead to transmit the data through the connection, the data is divided and sent twice by using the Scan Request message and the Scan Response message.

Next, the client transmits to the server a Connection Request message for establishing a Bluetooth connection with the server (S5020).

Therefore, a Link Layer (LL) connection is established between the server and the client.

Thereafter, the server and the client perform a security establishment procedure.

The security establishment procedure may be interpreted as security simple pairing or may be performed including the same.

That is, the security establishment procedure may be performed through Phase 1 through Phase 3.

Specifically, a pairing procedure (Phase 1) is performed between the server and the client (S5030).

In the pairing procedure, the client transmits a Pairing Request message to the server and the server transmits a Pairing Response message to the client.

Through the pairing procedure, authentication requirements and input (I)/output (O) capabilities and Key Size information are sent and received between the devices. Through the information, which key generation method is to be used in Phase 2 is determined.

Next, as Phase 2, legacy pairing or secure connections are performed between the server and the client (S5040).

In Phase 2, A 128-bit temporary key and a 128-bit short term key (STK) for performing the legacy pairing are generated.
 Temporary Key: Key made for creating the STK
 Short Term Key (LTK): Key value used for making encrypted connection between devices When the secure connection is performed in Phase 2, a 128-bit long term key (LTK) is generated.
 Long Term Key (LTK): Key value used even in later connection in addition to encrypted connection between the devices Next, as Phase 3, a Key Distribution procedure is performed between the server and the client (S5050).

Therefore, the secure connection may be established and the data may be transmitted and received by forming the encrypted link.

Isochronous Channel General

It can be seen that in the case of an audio signal, audio streaming data or audio data is periodically generated at an idle event interval.

The audio data is generated periodically (or at a specific time interval) according to characteristics thereof. Here, the specific time interval at which the audio data is periodically generated may be expressed as the idle event interval. Each audio data is transmitted at each idle event interval. Further, each audio data may be transmitted through an entire interval or a partial interval of the idle event interval. When the audio streaming data generated periodically or regularly is transmitted by using a BLE mechanism, advertising and scanning procedures, a communication procedure, and a disconnection procedure should be performed whenever the generated audio data is transmitted and received. However, the audio data is generally periodically generated, and a latency guarantee for transmission of the audio data is required regardless of the amount of the data.

However, when the advertising and scanning procedures, the communication procedure, and the disconnection procedure should be performed whenever newly generated audio data is transmitted, there is a problem in that a delay occurs in the audio data transmission.

In the audio data transmission through hearing aids (HA) or a headset, since a data generation amount is comparatively small, higher energy efficiency may be obtained when BLE technology is utilized rather than Bluetooth BR/EDR technology, but since a data channel process of the BLE technology should perform advertising, connection, etc., every data transmission as described above, the data channel process has large overhead in data transmission, and in particular, the latency guarantee which is absolutely required may not be guaranteed in the audio data transmission.

Further, the data channel process of the BLE technology has a purpose to increase energy efficiency by transmitting data which is generated intermittently only when necessary, and deriving deep sleep of a BLE device in other domains, so it may be difficult to apply the data channel process of the BLE technology to the transmission of the periodically generated audio data.

Isochronous Channel and Definition of Mechanism Related Thereto

A new channel, that is, an isochronous channel, is defined to transmit the periodically generated data using the BLE technology.

The isochronous channel is a channel used to transmit isochronous data between devices (e.g., conductor-member) using an isochronous stream.

The isochronous data refers to data transmitted at a specific time interval, that is, periodically or regularly.

That is, the isochronous channel may represent a channel through which the periodically generated data such as audio data or voice data is transmitted and received in the BLE technology.

The isochronous channel may be used to transmit and receive the audio data with a single member, a set of one or more coordinated members, or multiple members.

In addition, the isochronous channel corresponds to an isochronous stream such as audio streaming or a flushing channel that may be used to transmit and receive important data in another time domain.

The Bluetooth standard technology may be divided into Basic Rate/Enhanced Data Rate (BR/EDR) and Bluetooth low energy (LE). Among the two Bluetooth standard technologies, the Bluetooth BR/EDR is a wireless communication technology that occupies a dominant position in the short-range wireless personal area network (WPAN) technology market and is applied to many products.

The Bluetooth LE (hereafter, referred to as BLE) is designed to achieve higher energy efficiency compared to Bluetooth BR/EDR. In relation to the BLE, a method for updating parameters of a link for synchronous data exchange is under discussion.

In order to configure a cloud game system, wireless connection of a headset and ear buds for gaming audio and a controller for game control is required and at this time, low latency requirements must be satisfied to create a smooth game environment. Here, the headset, the ear buds, and the controller may be Bluetooth devices constituting the cloud game system, and in particular, may be the slave devices.

The headset and the ear bards for the gaming audio and the controller for the gaming control may perform additional connection and disconnection at a time desired by a user. The additional connection and disconnection may be performed in a relationship with the master device constituting the cloud game system. When a new device is added to the cloud game system, it is necessary to change connection parameters applied to a link between an existing master device and the slave device. Further, it is necessary to change the connection parameters configured in the link between the master device and the slave device according to a channel state according to the use of the cloud game system. It is impossible to change an existing connection parameter changing scheme during service use, and as a result, there is a problem in that a lot of time is required to change the connection parameters.

A mechanism to dynamically update the connection parameters may be needed to potentially process various channel conditions. A limitation of the existing isochronous stream is that once configured, the parameters are fixed and may not be changed while the connection is maintained. This may be a problem when a channel situation may be change variously. Since slots and common headers are used in the Bluetooth BR/EDR, opportunities to change link quality parameters even in a short time may be given more often. Therefore, it is necessary to have an efficient parameter update mechanism as in the Bluetooth BR/EDR for a connected isochronous stream (CIS) and a broadcast isochronous stream (BIS).

The present disclosure provides a parameter update method which may be applied to the Bluetooth LE. More specifically, the present disclosure provides a connection parameter update transition period configuring method based on the additional device connection, the disconnection, and the channel state. Proposed are a configuration method of a transition period and a protocol flow at a time when a device constituting the shared link is added and disconnected through the method. Through the method, a device may be added or excluded, which participates in a service while continuously using the service smoothly without service interruption. Further, even though the channel state is changed, the service may be used seamlessly.

Further, the present disclosure provides a method for individually configuring and operating connection parameters based on link characteristics. More specifically, the link characteristics may relate to whether the link is the link for the data transmission from the master device to the slave device or the link for the data transmission from the slave device to the master device. Further, the link characteristics may relate to the type of data transmitted through the link. The connection parameters may be independently configured according to data characteristics through the method, so the shared link may be operated more efficiently than a scheme of configuring the connection parameters equally with respect to (i) the link from the slave device to the master device and (ii) the link from the master device to the slave device regardless of the link characteristics. Through the methods proposed in the present disclosure, resources of a radio shared link constituting the cloud game may be efficiently operated.

FIG. 6 illustrates an example of a protocol stack to which a method proposed by the present disclosure may be applied. Referring to FIG. 6, the protocol stack to which the method proposed in the present disclosure may be applied may be constituted by Physical Transport(s), Physical Channel(s), Physical link(s), Logical Transport(s), and Logical link(s). In the present disclosure, the physical channel may mean a synchronized Bluetooth baseband-compliant RF hopping sequence.

A Piconet is a set of Bluetooth devices sharing the same physical channel defined by the master parameters (clock and BD ADDR).

The physical link may be a baseband level connection between two devices configured using paging. The physical link may include a transmission slot sequence of the physical channel alternating between the transmission slot of the master device and the transmission slot of the slave device.

Further, the LE isochronous physical channel may be characterized by a pseudo-random sequence of the PHY channel and three additional parameters provided by the master or connectionless broadcaster. The first parameter is a channel map representing a set of PHY channels, and the second parameter may be a pseudo random number used as an index for the entire set of PHY channels. The third parameter may be the timing of the first data packet. The timing of the first packet of CIS may be provided in the link layer message transmitted in the ACL connection connected by the master in a CIS configuration step. The timing of the first packet of the BIS may be referenced in periodic advertising events related to the BIS.

FIG. 7 illustrates an example of a data packet format which may be used in the protocol stack to which the method proposed by the present disclosure may be applied. Referring to FIG. 7, a data packet format that may be used in the protocol stack to which the method proposed in the present disclosure may be applied includes a preamble field, an access address field, a PDU header field, a PDU payload field, an MIC field, and a CRC field. The purpose of each field is illustrated in FIG. 7.

FIG. 8 is a diagram illustrating examples of Bluetooth LE audio data transmission. The channel defined to transmit the audio data in the Bluetooth LE is divided into two types, i.e., a connection-oriented isochronous (ICO) channel and a connectionless isochronous (ICL) channel. Based on the two channels, it is defined what operations devices must perform on the Bluetooth LE channel to transmit the audio data. FIG. 8(a) is a diagram regarding audio data transmission according to ICO and FIG. 8(b) is a diagram regarding the audio data transmission according to ICL. The ICO and the ICL make it possible to transmit the audio data to multiple devices and multiple profiles using audio data stream IDs and channel IDs.

Referring to FIG. 8(a), in the case of the ICO, it is possible to transmit and receive one stream to Slave1 (S1) and Slave2 (S2) by dividing one stream into two Channel IDs. In the Bluetooth audio system, if S1 is a wireless earphone worn on the user's right ear and S2 is a wireless earphone worn on the user's left ear, it is possible to listen to music transmitted by the Master (M) in stereo as illustrated in the figure. In Bluetooth audio data transmission according to the ICO, the audio data may be transmitted according to a unicast scheme.

Referring to FIG. 8(b), in the case of the ICL, unlike the audio data transmission in the ICO, it is possible to simultaneously transmit a single audio data stream to multiple slaves unidirectionally (M→S). In the Bluetooth audio data transmission according to the ICO, the audio data may be transmitted according to a multicast/broadcast scheme.

FIGS. 9 and 10 are diagrams illustrating an example of Bluetooth data transmission according to ICO. More specifically, FIGS. 9 and 10 are diagrams illustrating an example of data transmission in a Bluetooth LE isochronous channel. Referring to FIG. 9, one connected isochronous stream (CIS) event may include at least one subevent. In one subevent, (i) data transmission from the master device to the slave device and (ii) data transmission from the slave device to the master device may be sequentially performed. Further, as data transmission on an isochronous channel progresses, a channel state may change. Referring to FIG. 10(a), it can be seen that ACK transmission is performed from the slave device to the master device after data is transmitted from the master device to the slave device. In addition, it can be seen that when the data transmission from the master device to the slave device fails, data retransmission is performed in the next subevent of the corresponding subevent (slot). At this time, the number of retransmissions may be adjusted according to the channel state.

FIGS. 11 and 12 are diagrams illustrating an example of the Bluetooth data transmission according to ICL. More specifically, FIGS. 11 and 12 are diagrams illustrating an example of data transmission in a Bluetooth LE isochronous channel. Referring to FIG. 11, one broadcast isochronous stream (BIS) event may include at least one subevent. In one subevent, unidirectional data transmission from the master device to the slave device may be performed. Further, as the data transmission on the isochronous channel progresses, the channel state may change. Referring to FIG. 10(b), it can be seen that after the master device transmits (audio) data to the slave device in one subevent (slot), the master device transmits FEC of the (audio) data to the slave device in the next subevent.

A number of requirements must be satisfied for updating the connection parameters applied to the Bluetooth connection. In particular, with respect to isochronous connection update, the isochronous streams (CIS and BIS) do not support connection parameter update during connection. The connection parameter update is not supported during the connection, which may cause problems when the channel states vary between good and bad states. Therefore, the present disclosure proposes a mechanism for updating the connection parameters of the existing CIS & BIS, and proposes a method of combining and performing updates on several parameters in one process to perform an efficient connection update. The parameters may include PHY, burst number, flush timeout, and the like. The main requirements for supporting the above update mechanism are as follows.

An isochronous parameter update mechanism provides a method of performing simultaneous PHY and stream related parameter updates in a single procedure.

In the case of the CIS, the parameter may include at least one of ISO_interval, Sub_interval, Max_PDU size, number of bursts, flush timeout, the number of subevents, or PHY.

In the case of the BIS, the parameter may include at least one of ISO_interval, Sub_interval, Max_PDU size, a burst number, flush timeout, the number of subevents, PTO, IRC, BIS Spacing, or PHY.

The CIS parameter update mechanism should support fast update by applying a function after at least 6 CIS events.

The CIS parameter update mechanism provides an optional recovery mechanism for the relevant ACL in case of an error in a fast update mechanism.

A mechanism to update the BIS parameter after the stream is configured should be allowed. Due to the lack of feedback on the BIS PDU, the parameter update may be applied after future events.

When the LE controller decides to perform a connection (parameter) update, an operation consisting of the following two steps may be performed.

Depending on a link state, the need to change the connection parameters is determined.

Start and Completion of Connection Update

In the case of a poor link scenario where a flushed PDU ratio is approximately 5% (e.g., a burst is flushed in one of 20 CIS events), when the time spent in step 2) of the above two-step operations is minimized, the LE controller may make a faster decision in step 1).

For CIS with a 7.5 ms ISO interval configured with an associated ACL using a connection interval of 60 ms, a sub-rating factor of 4 is used to save power on the ACL connection. When the CIS connection update is performed using an ACL control procedure, an average time to perform the update may be at least equal to a time taken to reduce the low-rating factor to 1 and complete an LL control procedure. When a CIS connection update is performed using the ACL control procedure, the average time to perform the update may be equal to or more than an average time to the next low-rating ACL event+6*Base Conn Interval, i.e., (0.5*60*4+60*6)=480 ms (All control procedures including Instants adopt at least 6 connection events).

The connection parameter update mechanism proposed in the present disclosure may allow the update to be completed within ISO interval*6=45 ms. There is an effect in that the update timing may be improved by 10 times or more and a user experience may be improved through the method proposed in the present disclosure.

When it is assumed that the flushed PDU ratio is 5%, i.e., 1 every 20 CIS events, and the ISO interval is 7.5 ms, the PDU may be lost every 20*7.5 ms. Therefore, it may be efficient that a label based CIS update is performed. Further, a header error detection field is added to a label, so the label may be more stably transmitted to a CIS PDU header.

FIG. 13 is a diagram illustrating an example of a packet structure for supporting connection parameter update. In particular, the packet structure of FIG. 13 includes a Next-Label field, which is a field for updating parameters. The NextLabel field may consist of 4 bits, and when a link layer decides to perform the CIS connection update, the NextLabel field may be configured to a valid value between 0 and 15.

FIG. 14 is a diagram illustrating an example in which data transmission/reception is performed according to connection parameters. More specifically, FIG. 14 relates to a case in which connection parameter burst number (BN)=2, flush timeout (FT)=1, and number of sub events (NSE)=4. The BN is a parameter for the number of new payloads for each BIS of BIS events, the FT is a parameter for the maximum number of CIS events that may be used to transmit (and retransmit) a given CIS data PDU, and the NSE is a parameter related to the maximum number of subevents of each CIS event. A flush point of the PDU in the burst may occur immediately after U subevents in the CIS event. CisEventCounter may be expressed as (E+FT−1), and U may be expressed as U=NSE−floor(NSE÷BN)×(BN−1−cis-PayloadNumber mod BN. NSE may be expressed as NSE=Max(BN_M_To_S, BN_S_To_M)~31.

Peripheral devices may be grouped, and the grouped peripheral devices may receive only a single subframe identified with a group number. The peripheral device may also receive another subframe of another group, but data in an advertising packet may not be addressed to the peripheral device.

FIG. 15 is a diagram illustrating an example in which data transmission through a broadcast scheme and a response to transmitted data are performed. Referring to FIG. 15, when the peripheral device waits for receiving an AUX_SYNC_IND packet of a central device in a group subframe, the peripheral device sends AdvData to a host. Next, the host may process the data packet and decide if a response is required and a slot to which the host should respond. A response slot used by a specific peripheral device is decided by a central host, and the host communicates with the peripheral device with contents of the AUX_SYNC_IND packet. Then, the host may send, to the controller, response data and response slot information so that the controller may transmit the packet. To this end, the controller may remember the timing of a synchronous packet, and decide the timing of the response slot. A higher layer serves to decide whether the peripheral device is still synchronized with the central device.

When using longer payloads or possibly higher data rate PHYs, it may be necessary to a mechanism of updating the CIS parameter by a fast and efficient scheme when the channel state is changed between the good state and the bad state. The ACL connection connected when using the CIS may use a comparatively long connection interval. Relying on the ACL based control procedure may introduce a delay that degrades the user experience. Therefore, the present disclosure proposes a label based CIS update mechanism that enables 1) a fast connection update using the CIS header and 2) a function to combines several control procedures into a single task.

FIG. 16 is a flowchart showing an example in which the connection parameter update is performed.

S1610: A controller of a broadcaster alternately transmits BigInfo and BiginfoLabel to a receiver controller using an AUX_SYNC_IND+ACAD packet. The AUX_SYNC_IND+ACAD packet may be a data packet used for periodic advertising message transmission.

S1620: The receiver controller reports a periodic advertisement message event to a receiver host and reports a BigInfo event. Through the BigInfo event reporting, a reception timing of the receiver may be synchronized with the BIS transmitted by the broadcaster.

S1630: The controller of the broadcaster may transmit the BIS data to the receiver. When the channel state is good, the BIS data may represent Label 1 and when the channel state is bad, the BIS data may represent Label 2.

FIGS. 17 and 18 are diagrams illustrating an example in which update of connection parameters is performed. More specifically, FIGS. 17 and 18 are diagrams related to a case of changing the BN and the FT when a maximum PDU is not changed. Here, BN is a parameter for the number of new payloads for each BIS of broadcast isochronous stream (BIS) events and the FT is a parameter for the maximum number of CIS events that may be used to transmit a connected isochronous stream (CIS) data packet data unit (PDU). Since the FTxISO_Interval value is maintained, a waiting time value is not changed after the Instant. However, it may not be necessary to maintain the FTxISO_Interval value.

A transition payload means a payload with a CIS reference point before Instant (i) and a flush point after Instant (ii), and payloads corresponding to 5 and 6 may be the transition payloads in FIGS. 17 and 18. Parameters before being updated may be applied to the transition payload. As illustrated in FIGS. 17 and 18, the transition burst PDUs 5 and 6 have flush points at a transition period T. Referring to FIGS. 17 and 18, the transition period T may not include all CIS events. When all subevents are not included in the transition period T, the subevents may be ignored.

In FIGS. 17 and 18, the transition period may be configured according to the following three options.

Option 1 may be decided according to Equation 1 below.

$$T=(FT_{old}-1)*\text{ISO\_Interval}_{old} \quad\quad [\text{Equation 1}]$$

Option 2 may be decided according to Equation 2 below.

$$T=(\max(FT_{old},Ft_{new})-1)*\text{ISO\_Interval}_{new} \quad\quad [\text{Equation 2}]$$

Option 3 may be decided according to Equation 3 below.

$$T=(FT_{old}-1)*\text{ISO\_Interval}_{new} \quad\quad [\text{Equation 3}]$$

In the above equations, T represents the transition period, and subscripts old/new given to a specific parameter mean a configuration value before/after update of the specific parameter, respectively.

FIGS. 19 and 20 are diagrams illustrating another example in which the update of the connection parameters is performed. More specifically, FIGS. 19 and 20 are diagrams relating to the case of changing the FT. Referring to FIG. 19, the FT value is configured to 4 before parameter update, but the FT value is changed to 3 after the update. Here, a transition period T is configured according to option 1 of the transition period configuring method.

Referring to FIG. 20, the FT value is configured to 3 before the parameter update, but the FT value is changed to 4 after the update. Here, the transition period T is configured according to option 1 of the transition period configuring method.

FIGS. 21 and 22 are diagrams illustrating still yet another example in which the update of the connection parameters is performed. More specifically, FIGS. 21 and 22 relate to a case where the Max PDU is changed (increased), and FIG. 21 relates to an example in which the CIS updated is performed by merging two SDUs to use a hyper length PDU of 400 bytes and FIG. 22 relates to an example in which the CIS update is performed by merging three SDUs. Referring to FIG. 22, payloads 1, 2, 3, 4, and 5 with flush points after Instant are scheduled during the transition period T.

FIGS. 23 and 24 are diagrams illustrating still yet another example in which the update of the connection parameters is performed. More specifically, FIGS. 23 and 24 relate to cases in which the maximum PDU is changed (decreased). That is, in FIGS. 23 and 24, the controller performs an update to transit from a longer payload to a shorter payload. When the size of the maximum PDU is reduced, retransmission of transition payloads (payloads with CIS reference points prior to the Instant) after Instant may become impossible due to the reduction in maximum PDU size. That is, after the parameter update, the PDU becomes smaller, so retransmission of the immediately previous payload (information before the PDU becomes smaller) may not be performed after the Instant. In other words, the reduced PDU size may not contain the previous PDU size. So if all pending transition payloads are flushed before the Instant, a strict flush proposal should be able to be followed. To avoid a worst-case where multiple transition payloads get little or no opportunity to be transmitted, it may be desirable to implement a specific type of codec speed adaptation to reduce the size of the transition payload in order to increase an opportunity of successful reception before the Instant.

Referring to FIG. 24, an SDU with a label of 5 has a CIS reference point right after the Instant to maintain the waiting time. Accordingly, an SDU with a label of 4 may be an unscheduled SDU. Here, payloads 3 and 4 may be flushed before the Instant as indicated. When both the audio data and the control data are transmitted in one event, the control data does not have to have FT characteristics.

For a transition payload in which a flush point exists in the transition period T, the following operations may be performed to decide the flush point and optimize the transmission opportunity.

Based on the FTxISO_interval period of the payload, the furthest possible subevent within the period T that may be flushed is decided.

Assuming there are N subevent groups and each group has Group_NSE subevents and Group_BN number of payloads to be flushed, the flush point for each payload in the group is generated after a Group_U subevent of the group.

Here, the Group_U subevent may be determined by Equation 4 below.

$$\text{Group\_U}[i] = \text{Group\_NSE}[i] - \text{floor}(\text{Group\_NSE}[i]/\text{Group\_BN}[i]) \times (\text{Group\_BN}[i] - 1 - i \bmod \text{Group\_BN}[i]) \text{ for } i=0 \text{ to Group\_BN}[i]-1$$

[Equation 4]

FIG. 2 is a diagram illustrating still yet another example in which the update of the connection parameters is performed. More specifically, FIG. 25 is a diagram illustrating an example of allocating the flush point for the transition payload. Payloads {3, 4}, {5, 6}, and {7, 8} may be included in groups 0, 1, and 2, respectively based on the FTxISO_Interval period. Since payload {9, 10} also shares the event with payload 8, payload {9, 10} may be allocated to group 3. Accordingly, a method of designating Group BN and NSE according to characteristics of slave devices and connected devices may be required.

FIG. 26 is a flowchart showing an example in which the connection parameter update is performed.

S2610: The host of the master device indicates a configuration of a CIG parameter to the controller of the master device. Next, the host of the master device reports Cmd (command) completion from the controller of the master device. Thereafter, the host of the master device indicates a CIS generation to the controller of the master device. Next, the host of the master device reports a Cmd (command) state to the controller of the master device.

S2620: In the step, a connection for transmitting and receiving the audio data is established. The controller of the master device and the controller of the slave device report that a CIS connection is established to each host. The controller of the master device transmits a link layer (LL) CIS label request to the controller of the slave device. Thereafter, the controller of the slave device transmits an LL CIS response to the controller of the master device, and at this time, the LL CIS response is configured to label 2.

S2630: The controller of the master device transmits link layer (LL) CIS label request to the controller of the slave device. Thereafter, the controller of the slave device transmits the LL CIS response to the controller of the master device, and at this time, the LL CIS response is configured to label 3.

S2640: Thereafter, the host of the master device transmits CIS data to the controller of the master device. At this time, when the channel state deteriorates, the controller of the master device and the controller of the slave device report the CIS update event to the host of the master device and the host of the slave device, respectively. Thereafter, the host of the master device transmits CIS data in which label 2 is configured to the controller of the master device. Thereafter, the CIS update is performed in the n+6 event.

S2650: Thereafter, the host of the master device transmits CIS data to the controller of the master device. The controller of the master device transmits an LL CIS UPDATE LABEL IND packet which is configured to label 2 to the controller of the slave device and transmits data.

Only the central device may start label based CIS update by using CIS PDU header extension. The peripheral device may request the central device to activate the CIS update identified by the label provided to the PDU by using an LL CIS update request PDU.

The central device uses the modified CIS PDU header and configures a NextLabel field to a desired label identifier. The CIS event to which the update is applied is indicated by the Instant field, and is configured to at least 6 CIS events to provide sufficient retransmission opportunities for peripheral devices to receive the update indication.

At the earliest possible transmission opportunity in the connected LE ACL, the central device may send an LL CIS update indication PDU containing the label identifier and the CIS event of the Instant. This may serve as a backup mechanism when all intermediate CIS PDUs are lost. The operation may be optional if the peripheral device accepts a CIS PDU with a new label. In the opposite case, the operation may be mandatory.

The CIS updates is applied to the CIS event identified by the Instant field of the CIS PDU header or the Instant indicated by the LL CIS update indication PDU.

FIG. 27 is a diagram illustrating an example of a configuration of a cloud game system using a short-range wireless communication. Referring to FIG. 27, in a cloud game system using the short-range wireless communication, a game controller (Stadia controller) performs connection to a Chromecast device based on Wi-Fi, and Bluetooth may be used for initial connection. In the case of a game headset, a dedicated base station may be used for wireless connection of the headset. As the audio code, a Dolby audio codec may be used. The range of short-range wireless communication may be supported up to approximately 10 m (up to 30 ft), a standby battery life may be up to approximately 20 months, and a frequency of 2.4 GHz may be used for the short-range wireless communication. A method of configuring a wireless connection link of a headset by USB connecting a wireless adapter/dongle to a game platform (master device) (Xbox, PS4, etc.) may be used.

A retransmission number (RTN) with a large value may force the use of a high bandwidth. CIS transmission is designed considering the tradeoff between a scheme of achieving link quality with a high bandwidth and a scheme of utilizing the waiting time, but a value of a transmission waiting time is limited. Therefore, a scheme of keeping the delay low and increasing the performance according to the bandwidth, and keeping the bandwidth low and increasing the performance according to the delay may be required.

FIG. 28 is a diagram illustrating an example of a Basic Audio Profile QoS configuration. Referring to FIG. 28, in order to increase the reliability of data transmission and reception, a wide (many) bandwidth (BW) should be used. When the sample rate is high in the same BW, a connection-based scheme has small frame loss. On the other hand, when the sample rate is low, a broadcast-based scheme may have small frame loss. Accordingly, when the same frame loss is maintained, if the broadcast scheme requires more BW when the sample rate is high, the connection-based scheme may require more BW when the sample rate is low. On the other hand, when the sample rate is high, the connection-based scheme may be capable of transmitting with a lower-delay/lower BW than the broadcast-based scheme. That is, the connection-based scheme may be more suitable for low latency, but it is premised that many BWs (used similarly to high reliability) may be used. If there is a limitation in the use of BW or if a low sample rate needs to be used, the broadcast-based scheme may be more suitable. For example, if a hub device (e.g., TV, Game Platform, etc.) takes a lot of BW load, radio resource optimization may be required. In other words, it is necessary to provide UX so that only essential functions may be used smoothly through load balancing and an appropriate operation mode configuration when a limit is exceeded. Here, the appropriate operation mode operation may mean changing a sample rate or a transmission scheme.

FIG. 29 is a diagram illustrating an example of bandwidth usage of devices constituting a short-distance wireless communication system. FIG. 29 may relate to a cloud gaming system. In FIG. 29, it is assumed that the bandwidth efficiency is 100%. Since the sum of all bandwidth ratios used by the devices illustrated in FIG. 29 exceeds 100%, it may be necessary to optimize the used bandwidth by the appropriate operation mode configuration for the devices constituting the system.

FIGS. 30 and 31 are diagrams illustrating an example of a method for configuring a shared link in a short-range wireless communication system proposed by the present disclosure. The short-range wireless communication system in FIGS. 30 and 31 may be the cloud gaming system. Referring to FIG. 30, a TV, which is a cloud game platform, may form a connection with a gaming device group to provide a cloud game service. Here, the gaming device group may include a gaming headset, a game controller, and the like. In addition, in relation to a service provided by the TV other than the game service, the TV may form a connection with a device such as a TV remote controller or a TV sound bar. In the short-range wireless communication system, the TV may be the master device, and the device such as the gaming headset, the game controller, the TV remote controller, or the TV sound bar may be the slave device.

When the TV forms a connection with the devices constituting the gaming device group for the game service, the TV generates one shared link/bearer without generating an additional bearer or link independent for each device and exchanges data with the devices constituting the gaming device group through the shared link/bearer (3010). When a new gaming device is added while the shared link/bearer is already formed, the new gaming device may be added to the previously formed link/bearer without generating the additional bearer/link independent of the new gaming device. Meanwhile, when there is no previously formed shared link/bearer, the TV performs a shared link/bearer forming procedure with a device that initially forms a connection. The shared link proposed in the present disclosure is a link commonly used by all devices constituting the gaming device group. In addition, the shared link supports transmission and reception of application data having different characteristics, such as the audio data and the control data, and supports synchronized/isochronous transmission for low delay. The control data may be data generated based on an input of a user of the game controller to the controller device. Referring to reference numeral 3020 of FIG. 30, when the device forming the connection with the TV is not a device included in the gaming device group, a separate link/bearer for wireless communication with the TV suitable for service characteristics provided by each device is additionally generated (3020).

In addition, connection parameters configured in the shared link are subjected to a connection parameter update procedure when an additional audio device or controller device is connected or disconnected. If sufficient radio resources are not secured, the TV may configure a specific mode (e.g., game mode) to reject a link formation operation for another service.

Referring to FIG. 31, since a TV 3120, which is the game platform, transmits the audio data to an audio device 3121 and receives the control data from a control device 3122, the TV 3120 may have both an audio Profile and a control profile. In this case, the shared link may include two links, i.e., a link for transmitting the audio data of the TV and a link for receiving the control data. Since the audio device 3121 receives the audio data from the TV 3120, the audio device 3121 may have the audio profile. Since the control device 3122 receives the control data from the TV 3120, the control device 3122 may have the control profile.

FIG. 32 is a flowchart showing an example of a method for configuring a shared link in a short-range wireless communication system proposed by the present disclosure. In FIG. 32, devices A to D are devices providing the cloud gaming service. Device A is the master device, and devices B to D are the slave devices.

S3210: Devices B and C transmit an advertising message including information indicating that the cloud gaming service is provided when the user turns on devices B and C. Device A receives advertising messages from devices B and C, identifies that there are devices providing gaming services therearound, and transits an operation mode to the game mode. Device A may be the TV, a game display platform, or the like. In addition, devices B and C may be audio support devices (headsets), game controller devices, and the like.

S3220: Then, in the game mode, device A forms the shared link with device B and device C. If both devices B and C are the audio supporting devices, device A may transmit only the audio data to devices B and C. At this time, the audio data may be transmitted through an Aux Synch IND packet. A case in which both devices B and C are the audio supporting devices may be understood as a case in which only data from the master device to the slave device exists. Additionally, device A may be configured to broadcast the audio data and receive group ACKs of devices B and C for the audio data. Meanwhile, when one of devices B and C is the game controller device and the other device is the audio supporting device, device A may receive the control data from one of devices B and C, which is the game controller device, and transmit the audio data to the other device, which is the audio supporting device. At this time, the audio data may be transmitted through the Aux Synch IND packet. A case in which one of devices B and C is the game controller device and the other device is the audio support device may be understood as a case in which the data from the master device to the slave device and data from the slave device to the master device both exist.

S3230: When device D for the game service is additionally connected to device A, device D is added to the shared link, and the connection parameters are changed. That is, the connection parameter update may be performed to add device D to the shared link. At this time, device A may transmit an update request to devices B and C, which are devices configuring the existing shared link, through BIS Data with label or CIS Label Request, and perform the connection parameter update.

FIG. 33 is a diagram illustrating an example of a connection parameter update method proposed by the present disclosure. More specifically, FIG. 33 is a diagram related to a connection parameter update method considering SDU data characteristics. Referring to FIG. 33, data transmission/reception is performed by applying connection parameters before change in a time period 3310 before Instant, and data transmission/reception is performed by applying changed connection parameters in a time period 3320 after Instant. More specifically, a connection parameter changed after a transition period is applied. The transition period may be configured according to three options #1 to #3 illustrated in FIG. 33. Options #1 to #3 above correspond sequentially to the options described through Equations 1 to 3 above, respectively.

Among the three options, in the case of #1, when the Interval value is greater in New than in Old, there may be a case where the transition interval does not cover all CIS events to which new parameters are applied. In the case of #2, since Interval is used as a new application, the interval may contain enough Events with new parameters applied. In particular, when the value of the interval is greater in New than in Old, two or more events may be included in the transition period, and the transition may include even 2 to 3 events. In the case of #3, when the interval value is smaller in New than in Old, there may be a case where the transition interval does not cover all CIS events.

For all CISs of the CIG, when a plurality of links for data transmission from the master device to the slave device exists between the master device and a plurality of slave devices, the same FT value may be applied/configured for all of the plurality of links. Further, when the plurality of links for data transmission from the master device to the slave device exists between the master device and the plurality of slave devices, the same FT value may be applied/configured for all of the plurality of links. The same FT value applied to the plurality of links for the data transmission from the master device to the slave device and another same FT value applied to the plurality of links for the data transmission from the slave device to the master device may be different from each other.

In the present disclosure, for all CISs of the CIG, when a plurality of links for the data transmission from the master device to the slave device exists between the master device and the plurality of slave devices, different FT values may be applied/configured for the plurality of links by considering characteristics of the plurality of respective links. Further, when the plurality of links for data transmission from the master device to the slave device exists between the master device and the plurality of slave devices, different FT values may be applied/configured for all of the plurality of links by considering the characteristics of the plurality of respective links. More generally, for all CISs of the CIG, when the plurality of links for the data transmission from the master device to the slave device exists between the master device and the plurality of slave devices, different connection parameter values may be applied/configured for the plurality of links by considering the characteristics of the plurality of respective links. Further, when the plurality of links for data transmission from the slave device to the master device exists between the master device and the plurality of slave devices, different connection parameter values may be applied/configured for all of the plurality of links by considering the characteristics of the plurality of respective links. Different connection parameters applied in consideration of the characteristics of the plurality of links may further include parameters such as a transition period and BN.

In the shared link, each grouped subframe may have different FT and transition period values applied to a link from the master device to the slave device and a link from the slave device to the master device. The grouped subframes may be for audio data, control data of a control device, home data for each device, or uplink and downlink.

FIG. 34 is a diagram illustrating an example of a connection parameter update method proposed by the present disclosure. More specifically, FIG. 34 is a diagram related to a connection parameter update method considering SDU data characteristics. Referring to FIG. 34, data transmission/reception is performed by applying connection parameters before change in a time period before Instant, and data transmission/reception is performed by applying changed connection parameters in a time period after Instant.

In the SDU of FIG. 34, even numbers (2, 4, 6, etc.) indicate master to slave events, and odd numbers (1, 3, 5, etc.) indicate slave master events. In each of the Master to Slave Event and the Slave Master Event, it is possible to transmit and receive data of different data types. When exchanging heterogeneous data, a Link ID field of the data packet structure proposed in the present disclosure may be configured to Shared Link. Through the method proposed in this specification, synchronized data exchange with multiple devices may be possible. In addition, connection parameters may be individually assigned according to the type of data exchanged between devices. Depending on the type of data exchanged between devices, values of connection parameters applied to a link between the master device and each slave device may be configured differently. For example, in the Master to Slave Event, data of an audio nature may be broadcasted. At this time, a Group Address field of the data packet structure proposed in the present disclosure may be configured to "Broadcasting Address". In addition, in a Slave to Master Event, control-nature data may be exchanged between devices, and the group address may be assigned by grouping multiple slave devices. Slot assignment for each device among the grouped devices may be performed using a Frame Assigned ID field of the data packet structure proposed in the present disclosure. As an example of separately applying connection parameters according to data characteristics, the FT may be configured to a value smaller than that of audio type data in control type data. As another example, in the case of the control type data, the BN value may be configured according to the number of devices (the number of controllers) requesting the control type data. More specifically, when a device is added, the BN value may be increased when the connection parameter is updated, and conversely, when the device is removed, the BN value may be decreased. That is, the BN value may be configured/decided in proportion to the number of devices requesting the control type data (the number of controllers).

FIG. 35 is a diagram illustrating an example of a data packet structure used for connection parameter update proposed by the present disclosure. Referring to FIG. 35, in the data packet structure, a group address, a Link ID field, a frame assigned ID field, and a data type field may be included in the packet header. The Link ID field is used to identify the shared link, and the frame assigned ID field is used to indicate a slot assigned to each slave device in a situation where a master device is connected to multiple slave devices.

FIG. 36 is a diagram illustrating another example in which the connection parameter update method proposed by the present disclosure is performed.

In FIG. 36, a shared link manager device (master device) forms two unicast channels with two audio manager devices (slave devices/user devices #1 and #2), and two unicast channels, respectively, and transmits the audio data to two audio manager devices #1/#2 through two channels respectively formed (S3610). Reference numeral 3610 of FIG. 36 represents an example of transmitting the audio data to two audio manager devices #1/#2 of the shared link manager device through two channels respectively formed. One ICO channel interval consists of two sub-intervals, and in a first sub-interval, data transmission to audio manager device #1 may be performed, and in a second sub-interval, data transmission to audio manager device #2 may be performed.

Thereafter, the shared link manager device forms a shared link with the two audio manager devices (S3620). When the shared link is formed, the shared link manager device may transmit the audio data to two audio manager devices through one shared link. At this time, transmission of the audio data through the shared link may be performed according to a multicasting/broadcasting scheme.

Next, two controller devices #3 and #4 may be added to the shared link (S3630). At this time, the connection parameters of the shared link are updated for the addition of the two controller devices. The shared link manager device may receive the control data from controller devices through the Slave to Master Event. The Slave to Master Event corresponds to a unicast operation, and when the shared link manager device (master device) communicates with multiple controllers, the event is allocated to each device. Reference numeral 3620 of FIG. 36 represents an example of transmitting the audio data to two audio manager devices #1/#2 of the shared link manager device through the shared link and reception of the control data from two control devices. Referring to reference numeral 3620, in one shared link interval, both transmission of the audio data and reception of the control data are performed, but "1" (odd number) event is assigned to control device #3 and "2" (even number) event is assigned to control device #4. However, this is merely an example for convenience of description, and the method proposed in the present disclosure is not limited thereto.

FIGS. 37 and 38 are diagrams illustrating an example of an HCI command for supporting a method proposed by the present disclosure. Referring to FIG. 37(a), the host transmits an HCI command packet to the controller (S3710) and receives an HCI event packet from the controller (S3720). Thereafter, the host and the controller exchange HCI ACL data packets with each other (S3730) and exchange HCI synchronous data packets with each other (S3740).

Referring to FIG. 37(b), the following operations are performed in a GAM profile and a GAM LE Audio core of the master device (3710).

Deciding event allocated to Slave #1, #2, . . . .
Deciding interval.
Transmitting information to controller.
Transmitting audio multi channels.
Identifying power level.
Updating event to be allocated to Slave #1, #2, . . . .
Deciding interval and updating.
Transmitting information to controller.
Transmitting audio multi channels.

A HCI command for host and controller communication is configured and operated. At this time, if GAM and LE Audio Core are applied, a protocol stack may be configured as illustrated on the left side of FIG. 37(b), and an interface for communication from RF to Host may be required. In order to differentially configure and operate the connection parameter for each connection/link/device/data characteristics, information on how many salves are communicated, how many channels/streams are transmitted, and to which slave data transmitted to each event is transmitted should be exchanged between the RF and the host. FIG. 38 illustrates examples of HCI commands for the exchange.

FIGS. 39 and 40 are diagrams illustrating an example of a mode configuration method considering a device type and QoS. Referring to FIG. 39, hub devices such as TVs, game platforms, set-top boxes, and the like are wirelessly connected to various devices such as mobile phones, headsets, sound bars, game pads, and remote controllers to provide services. When the hub device simultaneously provides multiple services to multiple devices, a bandwidth load (BW load) may be a problem, and radio resource optimization is required at this time. For example, if the bandwidth load exceeds a range that may be resolved by load balancing or a total BW limit, it may be necessary to provide a UX so that only essential functions may be used smoothly by configuring/implementing an appropriate operation mode. In order to distribute the load, the hub device may secure some radio resources by transferring services through negotiation with the hub device that provides the same wired-connected functions (game, mirroring service, etc.). For example, when the TV directly uses wireless communication such as Wi-Fi to perform a mirroring service with a mobile phone, it is possible to optimize the radio resources by changing the operation mode to a specific mode for load management. The TV may have the following operation modes.

TV viewing mode: may be optimized for a TV viewing scenario only with a TV Local function without interlocking with an external device.

BT speaker mode: may provide an audio service jointly with a peripheral audio device (wireless speaker) or control devices (remote controller, light bulb, smart phone).

Mirroring mode: receiving A/V from other devices and shows the A/V to the user, and performing an operation such as waiting for connection with a Mirroring source device, etc.

Game mode: When a game pad is connected, a current radio resource operation state may be identified and the operation mode may be automatically changed. When the game mode is configured first, the TV may automatically recognize a game console and make the connection. The game console device may be configured to prioritize an input delay time.

FIG. 40 is a diagram related to an example of a QoS configuration change according to an operation mode change. Referring to FIG. 40, it can be seen that the QoS configuration may be optimized by changing the operation mode from a specific operation mode to another operation mode.

FIG. 41 is a diagram illustrating an example in which a method for transmitting and receiving data proposed by the present disclosure is performed. More specifically, a master device receives, from a first slave device, a first advertising message for providing a service related to transmitting and receiving data (S4110).

Next, the master device forms a shared link for transmitting and receiving the data based on the first advertising message, based on a link parameter for a configuration of the shared link (S4120). Here, the shared link includes (i) a first link for data transmission from the master device to a slave device, and (ii) a second link for data transmission from the slave device to the master device.

Next, the master device receives, from a second slave device, a second advertising message for providing the service (S4130). In this case, the link parameter applied to the shared link is updated to add the second slave device to a slave device related to the shared link based on the second advertising message, and the updated link parameter is configured to different values for (i) the first link and (ii) the second link based on characteristics of the first link and characteristics of the second link.

It is apparent to those skilled in the art that the present disclosure can be embodied in other specific forms without departing from the essential characteristics of the present disclosure. Accordingly, the foregoing detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

The aforementioned embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

An embodiment of the present disclosure may be implemented by various means, for example, hardware, firmware, software or a combination of them. In the case of implementations by hardware, an embodiment of the present disclosure may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure. Further, although the disclosure has described both product disclosures and process disclosures, description of both disclosures may be complementarily applied as needed.

INDUSTRIAL APPLICABILITY

The preferred embodiments of the present disclosure described above are disclosed for an exemplary purpose, and modifications, changes, substitutions, or additions of various other embodiments may be hereinafter made by those skilled in the art within the technical spirit and the technical scope of the present disclosure disclosed in the appended claims.

What is claimed is:
1. A method for transmitting and receiving, by a master device, data in a short-range wireless communication system, the method comprising:
receiving, from a first slave device, a first advertising message for providing a service related to transmitting and receiving the data;
forming a shared link for transmitting and receiving the data based on the first advertising message, based on a link parameter for a configuration of the shared link,
wherein the shared link includes (i) a first link for data transmission from the master device to a slave device, and (ii) a second link for data transmission from the slave device to the master device; and
receiving, from a second slave device, a second advertising message for providing the service,
wherein the link parameters applied to the shared link is updated in order to add the second slave device as a slave device related to the shared link based on the second advertising message, and wherein the updated link parameters are configured as different values for each of (i) the first link and (ii) the second link based on the characteristics of the first and second links.

2. The method of claim 1, wherein the data transmitted on the first link and the data transmitted on the second link are different types of data.

3. The method of claim 2, wherein the data transmitted on the first link is audio data related to the service.

4. The method of claim 3, wherein the data transmitted on the second link is control data related to the service, and
wherein the control data is generated based on a user input into the slave device.

5. The method of claim 4, wherein the audio data is transmitted based on a broadcast or multicast scheme.

6. The method of claim 5, wherein when the second slave device is added as the slave device related to the shared link, the audio data is transmitted based on grouping for the first slave device and the second slave device, and
wherein a group address for transmission of the audio data is allocated to the grouped first slave and second slave device.

7. The method of claim 4, wherein the link parameters include (i) a first parameter for the maximum number of CIS events which may be used for transmission of connected isochronous stream (CIS) data packet data unit (PDU) and (ii) a second parameter for the number of new payloads for each broadcast isochronous stream (BIS) of a BIS event.

8. The method of claim 7, wherein a value of the first parameter applied to the first link is configured to a value smaller than the value of the first parameter applied to the second link.

9. The method of claim 8, wherein a value of the second parameter applied to the second link is determined in proportion to the number of slave devices related to the second link.

10. The method of claim 1, wherein each of the first advertising message and the second advertising message includes identification information for the service.

11. The method of claim 10, further comprising:
changing an operation mode of the master device to a specific operation mode for providing the service based on the identification information and (ii) a size of a bandwidth usable for providing the service in an entire bandwidth allocated to the master device.

12. The method of claim 1, further comprising:
transmitting, to the first slave device, a request message for requesting the update of the link parameter.

13. The method of claim 12, wherein the request message is configured based on a CIS label request.

14. The method of claim 12, wherein the request message is configured based on BIS data with label.

15. A master device for transmitting and receiving data in a short-range wireless communication system, the master device comprising:
a transmitter for transmitting a radio signal;
a receiver for receiving the radio signal;
at least one processor; and
at least one computer memory operably connectable to the at least one processor, and storing instructions of performing operations when executed by the at least one processor,
wherein the operations include
receiving, from a first slave device, a first advertising message for providing a service related to transmitting and receiving the data,
forming a shared link for transmitting and receiving the data based on the first advertising message, based on a link parameter for a configuration of the shared link,
wherein the shared link includes (i) a first link for data transmission from the master device to a slave device, and (ii) a second link for data transmission from the slave device to the master device, and
receiving, from a second slave device, a second advertising message for providing the service,
wherein the link parameter applied to the shared link is updated in order to add the second slave device to a slave device related to the shared link based on the second advertising message, and
wherein the updated link parameters are configured as different values for each of (i) the first link and (ii) the second link based on the characteristics of the first and second links.

* * * * *